(12) United States Patent
Ko et al.

(10) Patent No.: US 10,945,253 B2
(45) Date of Patent: *Mar. 9, 2021

(54) METHOD OF TRANSMITTING AND RECEIVING DOWNLINK CHANNEL AND APPARATUS THEREFOR

(71) Applicant: LG Electronics Inc., Seoul (KR)

(72) Inventors: Hyunsoo Ko, Seoul (KR); Youngsub Kim, Seoul (KR); Sukhyon Yoon, Seoul (KR); Kijun Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,888

(22) Filed: Mar. 18, 2019

(65) Prior Publication Data

US 2019/0223163 A1 Jul. 18, 2019

Related U.S. Application Data

(63) Continuation of application No. 16/318,086, filed as application No. PCT/KR2018/014132 on Nov. 16, 2018, now Pat. No. 10,791,550.

(Continued)

(51) Int. Cl.
*H04W 4/00* (2018.01)
*H04W 72/04* (2009.01)
(Continued)

(52) U.S. Cl.
CPC ........... *H04W 72/042* (2013.01); *H04L 5/001* (2013.01); *H04L 5/0048* (2013.01); *H04L 27/26* (2013.01);
(Continued)

(58) Field of Classification Search
CPC .................................................. H04L 27/2613
See application file for complete search history.

(56) References Cited

U.S. PATENT DOCUMENTS 9,544,885 B2 1/2017 You et al.
9,655,087 B2 * 5/2017 Park .................. H04W 72/0413
(Continued)

FOREIGN PATENT DOCUMENTS

KR 10-2012-0089254 A 8/2012
KR 10-2015-0028249 A 3/2015
(Continued)

OTHER PUBLICATIONS

Qualcomm Incorporated, "Synchronization Raster for NR", 3GPP TSG-RAN WG4 NR Ad-hoc#3, Sep. 21-25, 2017, R4-1709313.
(Continued)

*Primary Examiner* — Guang W Li
(74) *Attorney, Agent, or Firm* — Dentons US LLP

(57) ABSTRACT

A method for a user equipment to receive a PDCCH (Physical Downlink Control Channel) for RMSI (Remaining Minimum System Information). The method comprises: receiving an SS/PBCH block containing an SS (Synchronization Signal) and a PBCH (Physical Broadcasting Channel); obtaining information related to a CORESET (Control resource set) for the PDCCH; and receiving the PDCCH within the CORESET based on the information. The information includes an offset between a frequency position of the SS/PBCH block related to the CORESET and a frequency position of the CORESET. Values of the offset are defined based on subcarrier spacing of the SS/PBCH block and a minimum channel bandwidth.

7 Claims, 28 Drawing Sheets

Related U.S. Application Data

(60) Provisional application No. 62/587,495, filed on Nov. 17, 2017, provisional application No. 62/617,120, filed on Jan. 12, 2018, provisional application No. 62/630,844, filed on Feb. 15, 2018.

(51) Int. Cl.

| | | |
|---|---|---|
| *H04L 5/00* | (2006.01) | |
| *H04L 27/26* | (2006.01) | |
| *H04W 48/12* | (2009.01) | |
| *H04W 48/16* | (2009.01) | |
| *H04W 56/00* | (2009.01) | |

(52) U.S. Cl.
CPC ...... *H04L 27/2657* (2013.01); *H04L 27/2666* (2013.01); *H04W 48/12* (2013.01); *H04W 48/16* (2013.01); *H04W 56/00* (2013.01); *H04W 72/04* (2013.01)

(56) References Cited

U.S. PATENT DOCUMENTS

| | | | |
|---|---|---|---|
| 2017/0331613 A1 | 11/2017 | Ly et al. | |
| 2018/0084593 A1* | 3/2018 | Chen | H04W 76/11 |
| 2018/0098298 A1 | 4/2018 | Jung et al. | |
| 2018/0167195 A1 | 6/2018 | Ly et al. | |
| 2018/0167946 A1* | 6/2018 | Si | H04W 72/1252 |
| 2018/0192383 A1* | 7/2018 | Nam | H04L 5/0044 |
| 2018/0198648 A1* | 7/2018 | Sun | H04J 11/0073 |
| 2018/0270771 A1 | 9/2018 | Chendamarai Kannan et al. | |
| 2018/0324804 A1* | 11/2018 | Aiba | H04W 72/0453 |
| 2018/0324843 A1* | 11/2018 | Lee | H04W 72/1289 |
| 2018/0337755 A1* | 11/2018 | John Wilson | H04L 27/2675 |
| 2018/0368145 A1* | 12/2018 | Abdoli | H04L 5/00 |
| 2019/0021119 A1* | 1/2019 | Ng | H04W 72/0453 |
| 2019/0028315 A1 | 1/2019 | Park | |
| 2019/0052434 A1* | 2/2019 | Zhou | H04L 27/2602 |
| 2019/0069256 A1 | 2/2019 | Jung et al. | |
| 2019/0069322 A1 | 2/2019 | Davydov et al. | |
| 2019/0089474 A1* | 3/2019 | Ly | H04L 27/2602 |
| 2019/0098590 A1* | 3/2019 | Nam | H04W 48/00 |
| 2019/0104477 A1 | 4/2019 | MolavianJazi et al. | |
| 2019/0104500 A1 | 4/2019 | Reial et al. | |
| 2019/0109700 A1* | 4/2019 | Liu | H04L 27/2613 |
| 2019/0123992 A1 | 4/2019 | Ly et al. | |
| 2019/0132170 A1* | 5/2019 | Si | H04L 27/266 |
| 2019/0140776 A1 | 5/2019 | Seo et al. | |
| 2019/0140880 A1* | 5/2019 | Li | H04L 5/00 |
| 2019/0150121 A1* | 5/2019 | Abdoli | H04L 27/2613 370/329 |
| 2019/0150124 A1* | 5/2019 | Nogami | H04W 72/042 370/330 |
| 2019/0150183 A1 | 5/2019 | Aiba et al. | |
| 2019/0158205 A1* | 5/2019 | Sheng | H04J 11/0076 |
| 2019/0190582 A1* | 6/2019 | Guo | H04B 7/0626 |
| 2020/0244530 A1* | 7/2020 | Lin | H04W 56/001 |

FOREIGN PATENT DOCUMENTS

| | | |
|---|---|---|
| KR | 10-2015-0108348 A | 9/2015 |
| KR | 10-2017-0121705 A | 11/2017 |
| WO | 2017/010798 A1 | 1/2017 |

OTHER PUBLICATIONS

CATT, "Remaining details on RMSI", 3GPP TSG RAN WG1 Meeting 90bis, Oct. 9-13, 2017, R1-1717799.
MediaTek Inc., "Summary of Bandwidth Part Operation", 3GPP TSG RAN WG1 Meeting 90bis, Oct. 9-13, 2017, R1-1718901.
LG Electronics: "RMSI delivery and CORESET configuration", R1-1717927, 3GPP TSG RAN WG1 Meeting 90bis, Prague, Czech Republic, Oct. 9-13, 2017.
Huawei, et al.: "RMSI delivery", R1-1717050, 3GPP TSG RAN WG1 Meeting 90bis, Prague, Czech Republic, Oct. 9-13, 2017.
ZTE: "Remaining details of RMSI", R1-1717032, 3GPP TSG RAN WG1 Meeting 90bis, Prague, Czech Republic, Oct. 9-13, 2017.
NTT Docomo, Inc.: "Discussion on remaining details on RMSI delivery", R1-1718181, 3GPP TSG RAN WG1 Meeting 90bis, Prague, Czech Republic, Oct. 9-13, 2017.
R1-1718528: 3GPP TSG RAN WG1 Meeting 90bis, Prague, Oct. 9-13, 2017, Qualcomm Incorporated, "Remaining system information delivery consideration," pp. 1-8.
Nokia: "Remaining details on NR-PBCH", R1-1716524, 3GPP TSG RAN WG1 NR AH#3, Nagoya, Japan, Sep. 18-21, 2017.
LG Electronics: "RMSI delivery and CORESET configuration", R1-1715842, 3GPP TSG RAN WG1 NR AH#3, Nagoya, Japan, Sep. 18-21, 2017.
LG Electronics: "RMSI delivery and CORESET configuration", R1-1719894, 3GPP TSG RAN WG1 Meeting #91, Reno, USA, Nov. 27-Dec. 1, 2017.
Huawei, HiSilicon, "On initial access for wideband carrier", 3GPP TSG RAN WG1 NR Ad Hoc Meeting, Jun. 27-30, 2017, R1-1709973.
CMCC, "Common Coreset design for RMSI scheduling", 3GPP TSG RAN WG1 Meeting #90, Aug. 21-25, 2017, R1-1713832.
NTT DoCoMo, Inc., "Discussion on remaining details on RMSI delivery", 3GPP TSG RAN WG1 Meeting NR#3, Sep. 18-21, 2017, R1-1716071.
ZTE Corporation, "NR channel raster and sync raster", 3GPP TSG-RAN WG4 Meeting NR AH#3, Sep. 18-21, 2017, R4-1709496.

* cited by examiner (A) CONTROL-PLANE PROTOCOL STACK (B) USER-PLANE PROTOCOL STACK (a)

| Signals | SCS | corres. T/F res | OFDM symbols |
|---|---|---|---|
| SS/PBCH block | 240kHz | 20PRBs x 40S | 0 1 2 3 4 5 6 7 8 9 10 11 12 13 0 1 2 3 4 5 6 7 8 9 10 11 12 13 |
| RMSI CORESET(first 20ms) | 60kHz | 96PRBs x 10S | 0 1 2 3 4 5 6 7 8 9 10 11 12 13 |
| RMSI CORESET(next 20ms) | 60kHz | 96PRBs x 10S | 0 1 2 3 4 5 6 7 8 9 10 11 12 13 |

| Signals | SCS | OFDM symbols | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| SS/PBCH block | 240kHz | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | |
| Type A RMSI CORESET | 120kHz | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | |
| | | DL | | | | | | | | | | | | Gap+UL | | DL | | | | | | | | | | | | | Gap+UL | |
| Type B RMSI CORESET | 120kHz | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | |

METHOD OF TRANSMITTING AND RECEIVING DOWNLINK CHANNEL AND APPARATUS THEREFOR

This application is a continuation application of U.S. patent application Ser. No. 16/318,086 filed Jan. 15, 2019, which is a National Stage Entry of International Application No. PCT/KR2018/014132 filed Nov. 16, 2018, which claims priority to U.S. Provisional Application Nos. 62/587,495 filed Nov. 17, 2017; 62/617,120 filed Jan. 12, 2018 and 62/630,844 filed Feb. 15, 2018, all of which are incorporated herein by reference.

TECHNICAL FIELD

The present invention relates to a method of transmitting and receiving a downlink channel and an apparatus therefor, and more particularly, to a method of transmitting and receiving a downlink channel based on information on a downlink bandwidth forwarded via PBCH (Physical Broadcast Channel) contents included in an SSB (Synchronization Signal Block (SSB)) and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE OF THE INVENTION

Technical Task

A technical task of the present invention is to provide a method of transmitting and receiving a downlink channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of receiving a PDCCH (Physical Downlink Control Channel), which is received by a user equipment (UE) for RMSI (Remaining Minimum System Information) in a wireless communication system, includes receiving an SS/PBCH block including an SS (synchronization signal) and a PBCH (Physical Broadcasting Channel), obtaining information on a CORESET (Control resource set) for the PDCCH via the PBCH, and receiving the PDCCH within the CORESET based on the information. In this case, the information includes an offset between a frequency position of an SS/PBCH block related to the CORESET and a frequency position of the CORESET and values capable of being defined as the offset can be defined based on subcarrier spacing of the SS/PBCH block and a minimum channel bandwidth.

In this case, a size of a synchronization raster for the SS/PBCH block can be defined based on the minimum channel bandwidth and the subcarrier spacing of the SS/PBCH block.

The offset may correspond to a relative distance between one SS/PBCH block selected from among the lowest resource block (RB) of the CORESET and SS/PBCH blocks transmitted from at least one synchronization raster and the CORESET.

When the lowest RB of the CORESET is positioned between two SS/PBCH blocks, an SS/PBCH block positioned at a higher frequency position among the two SS/PBCH blocks can be determined as the one SS/PBCH block.

The one SS/PBCH block may correspond to an SS/PBCH block closest to the center RB of the CORESET.

The number of bits necessary for the information may vary based on the subcarrier spacing of the SS/PBCH block and the minimum channel bandwidth.

To further achieve these and other advantages and in accordance with the purpose of the present invention, according to a different embodiment, a communication device for receiving a PDCCH (Physical Downlink Control Channel) for RMSI (Remaining Minimum System Information) in a wireless communication system includes a memory and a processor connected with the memory, the processor configured to receive an SS/PBCH block including an SS (synchronization signal) and a PBCH (Physical Broadcasting Channel), the processor configured to obtain information on a CORESET (Control resource set) for the PDCCH via the PBCH, the processor configured to receive the PDCCH within the CORESET based on the information. In this case, the information includes an offset between a frequency position of an SS/PBCH block related to the CORESET and a frequency position of the CORESET and values capable of being defined as the offset can be defined based on subcarrier spacing of the SS/PBCH block and a minimum channel bandwidth.

In this case, a size of a synchronization raster for the SS/PBCH block can be defined based on the minimum channel bandwidth and the subcarrier spacing of the SS/PBCH block.

The offset may correspond to a relative distance between one SS/PBCH block selected from among the lowest resource block (RB) of the CORESET and SS/PBCH blocks transmitted from at least one synchronization raster and the CORESET.

When the lowest RB of the CORESET is positioned between two SS/PBCH blocks, an SS/PBCH block positioned at a higher frequency position among the two SS/PBCH blocks can be determined as the one SS/PBCH block.

The one SS/PBCH block may correspond to an SS/PBCH block closest to the center RB of the CORESET.

The number of bits necessary for the information may vary based on the subcarrier spacing of the SS/PBCH block and the minimum channel bandwidth.

To further achieve these and other advantages and in accordance with the purpose of the present invention, according to a further different embodiment, a method of transmitting a PDCCH (Physical Downlink Control Channel), which is transmitted by a base station for RMSI (Remaining Minimum System Information) in a wireless communication system, includes transmitting an SS/PBCH block including an SS (synchronization signal) and a PBCH (Physical Broadcasting Channel) and transmitting the PDCCH within the CORESET based on information on a CORESET (Control resource set) for the PDCCH forwarded via the PBCH. In this case, the information includes an offset between a frequency position of an SS/PBCH block related to the CORESET and a frequency position of the CORESET and values capable of being defined as the offset can be defined based on subcarrier spacing of the SS/PBCH block and a minimum channel bandwidth.

To further achieve these and other advantages and in accordance with the purpose of the present invention, according to a further different embodiment, a communication device for transmitting a PDCCH (Physical Downlink Control Channel) for RMSI (Remaining Minimum System Information) in a wireless communication system, includes a memory and a processor connected with the memory, the processor configured to transmit an SS/PBCH block including an SS (synchronization signal) and a PBCH (Physical Broadcasting Channel), the processor configured to transmit the PDCCH within the CORESET based on information on a CORESET (Control resource set) for the PDCCH forwarded via the PBCH. In this case, the information includes an offset between a frequency position of an SS/PBCH block related to the CORESET and a frequency position of the CORESET and values capable of being defined as the offset can be defined based on subcarrier spacing of the SS/PBCH block and a minimum channel bandwidth.

Advantageous Effects

According to the present invention, it is able to receive information on a bandwidth for downlink via a synchronization signal block and efficiently receive a downlink channel within a bandwidth which is configured based on the received information.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DESCRIPTION OF DRAWINGS

FIGS. 17 to 27 are diagrams for explaining a method of configuring a CORESET for RMSI and a method of configuring a monitoring window for PDCCH corresponding to the CORESET.

BEST MODE

Mode for Invention

Figure 1:
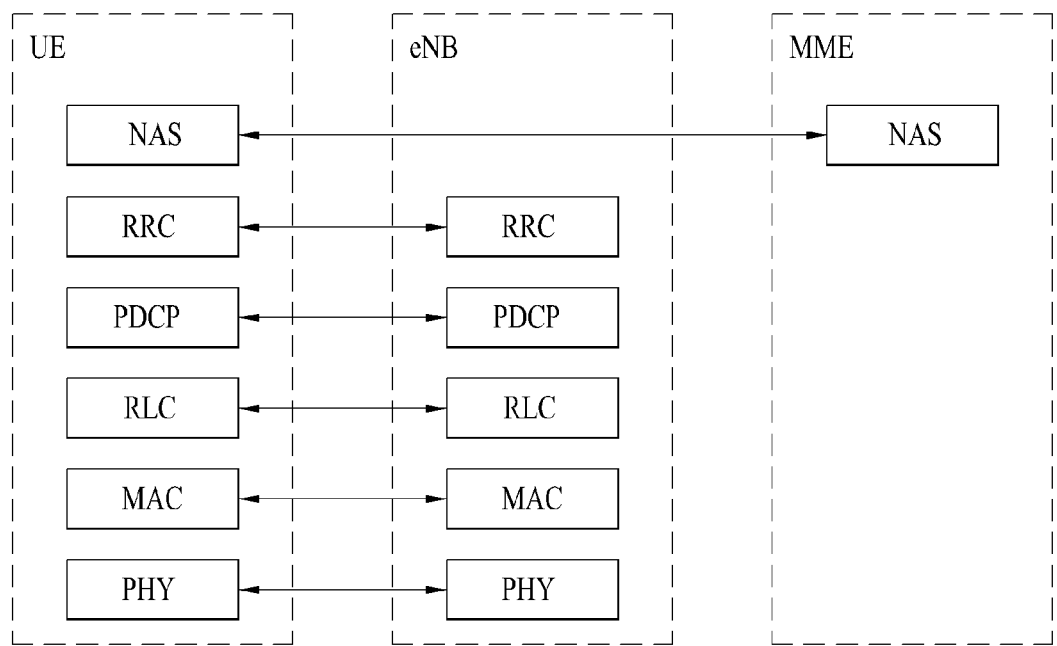
FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
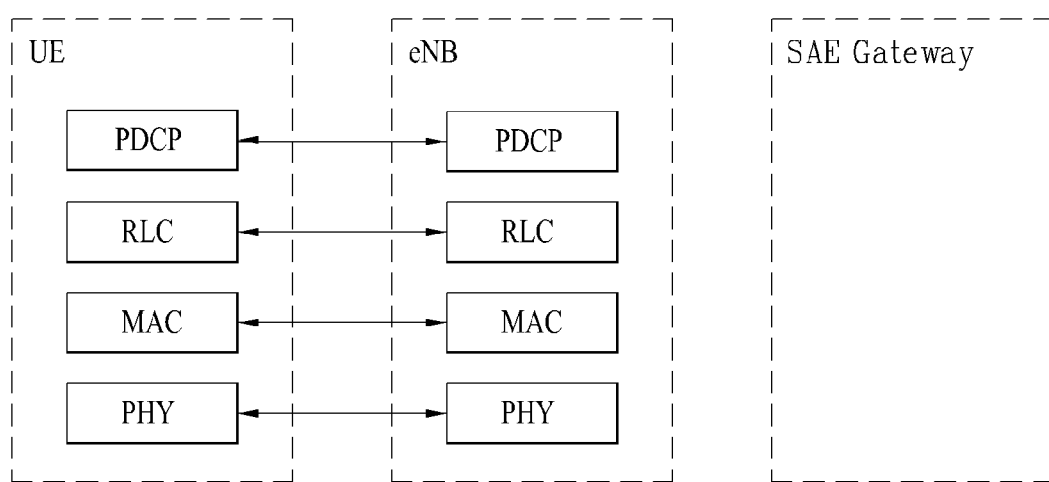

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
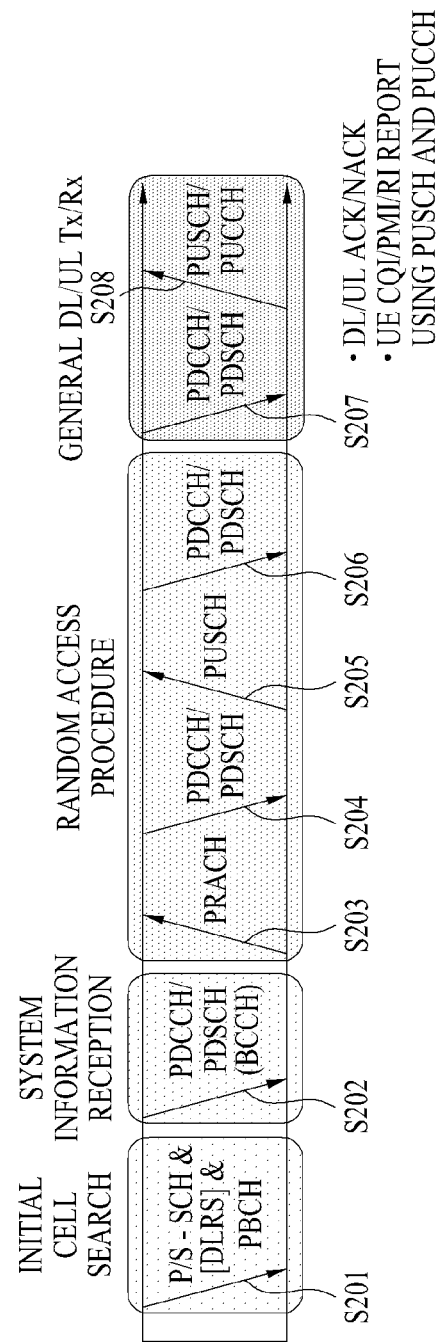
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
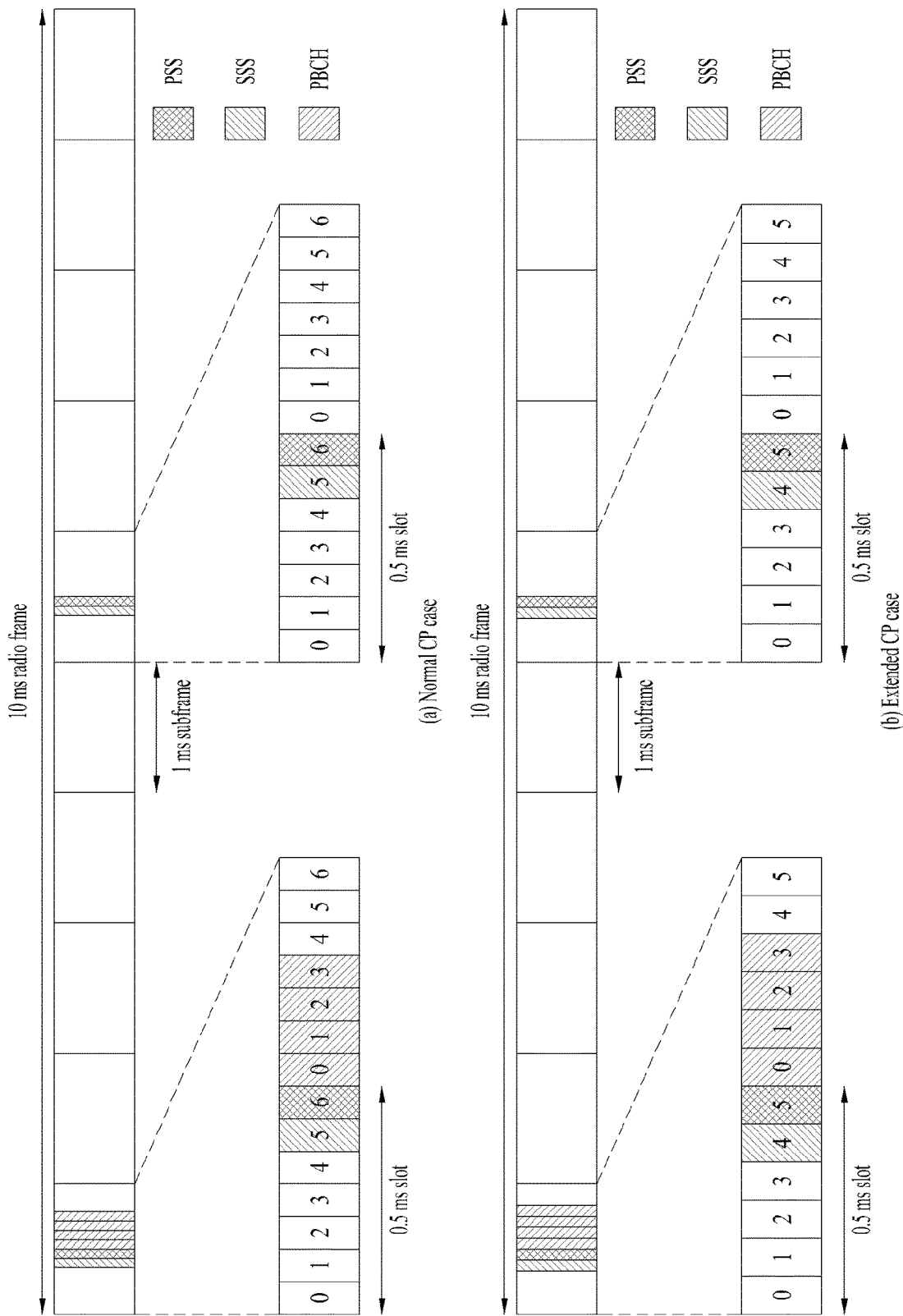
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
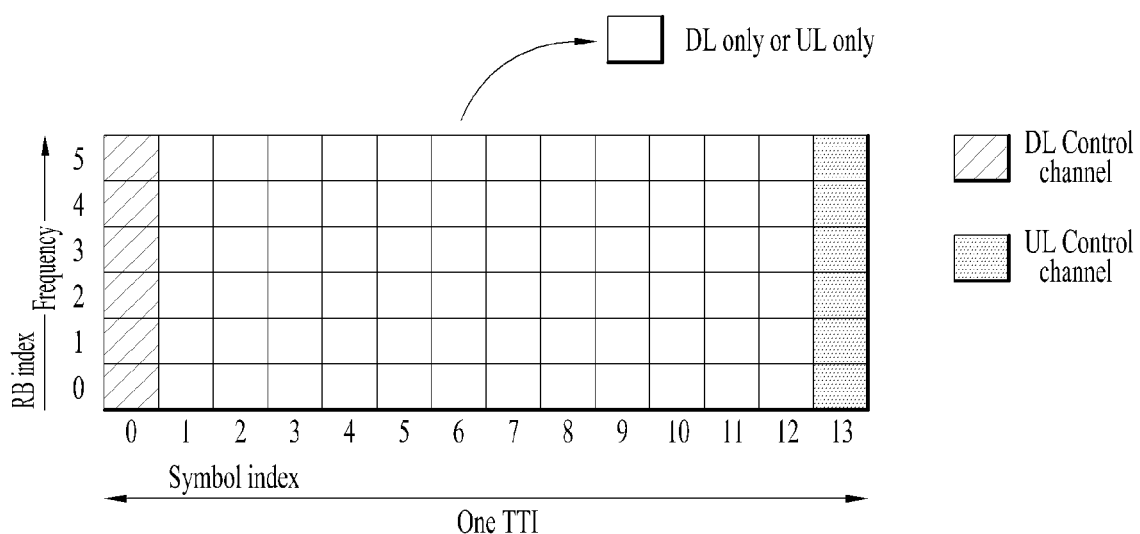
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms (307200$T_s$) long, including 10 equal-size subframes (SFs). The 10 SFs of one radio frame may be assigned numbers. $T_s$ represents a sampling time and is expressed as $T_s=1/(2048*15 kHz)$. Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in 5th generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, $T_s$ is defined as $1/(15000*2048)$ seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than $1/(15000*2048)$ seconds. For example, the actual sampling time for the subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
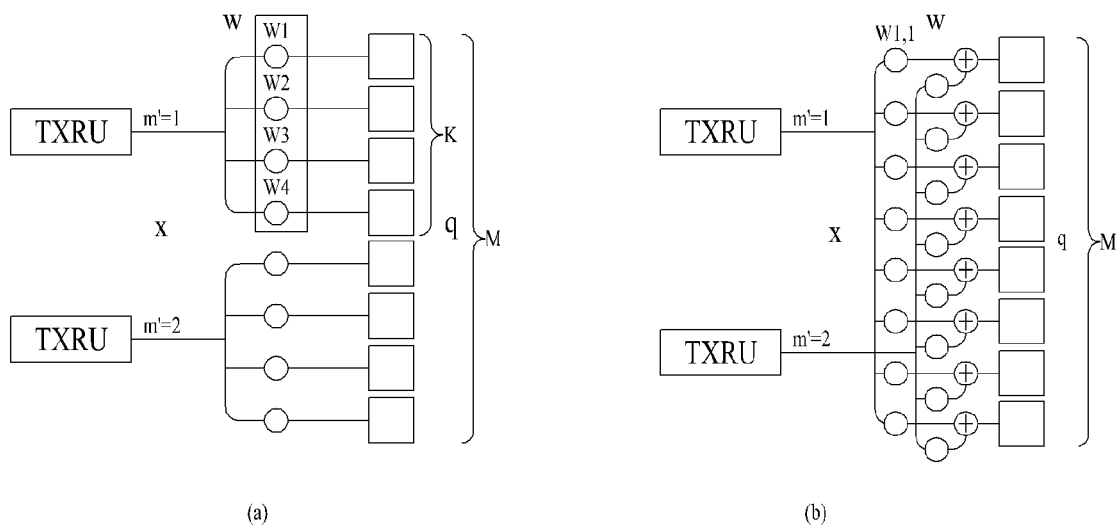
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
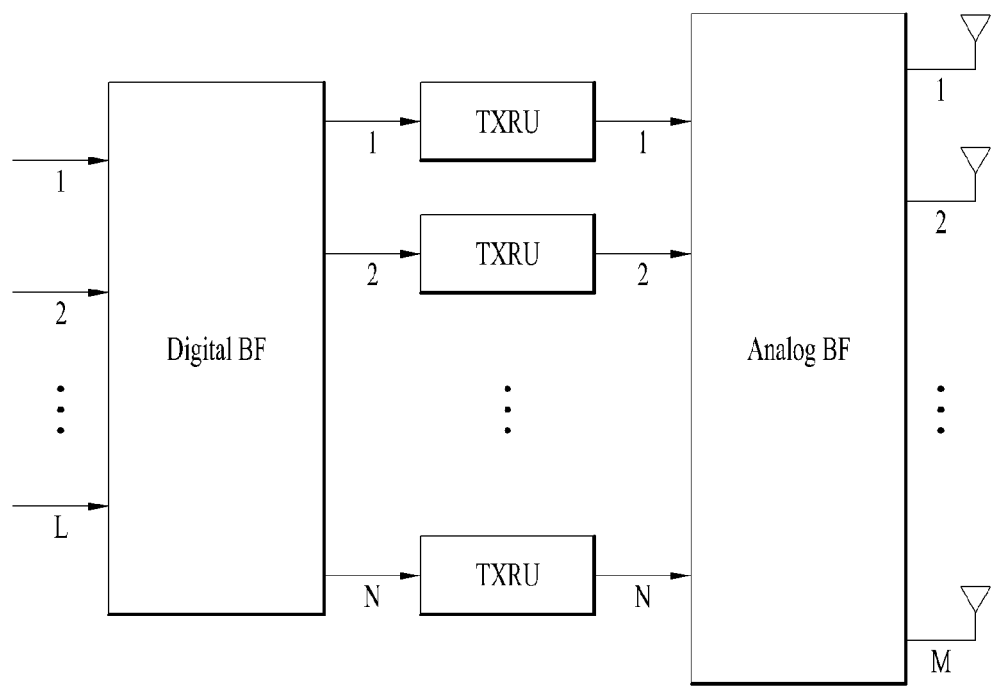
FIG. 6 is a view abstractly illustrating a hybrid beam-forming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
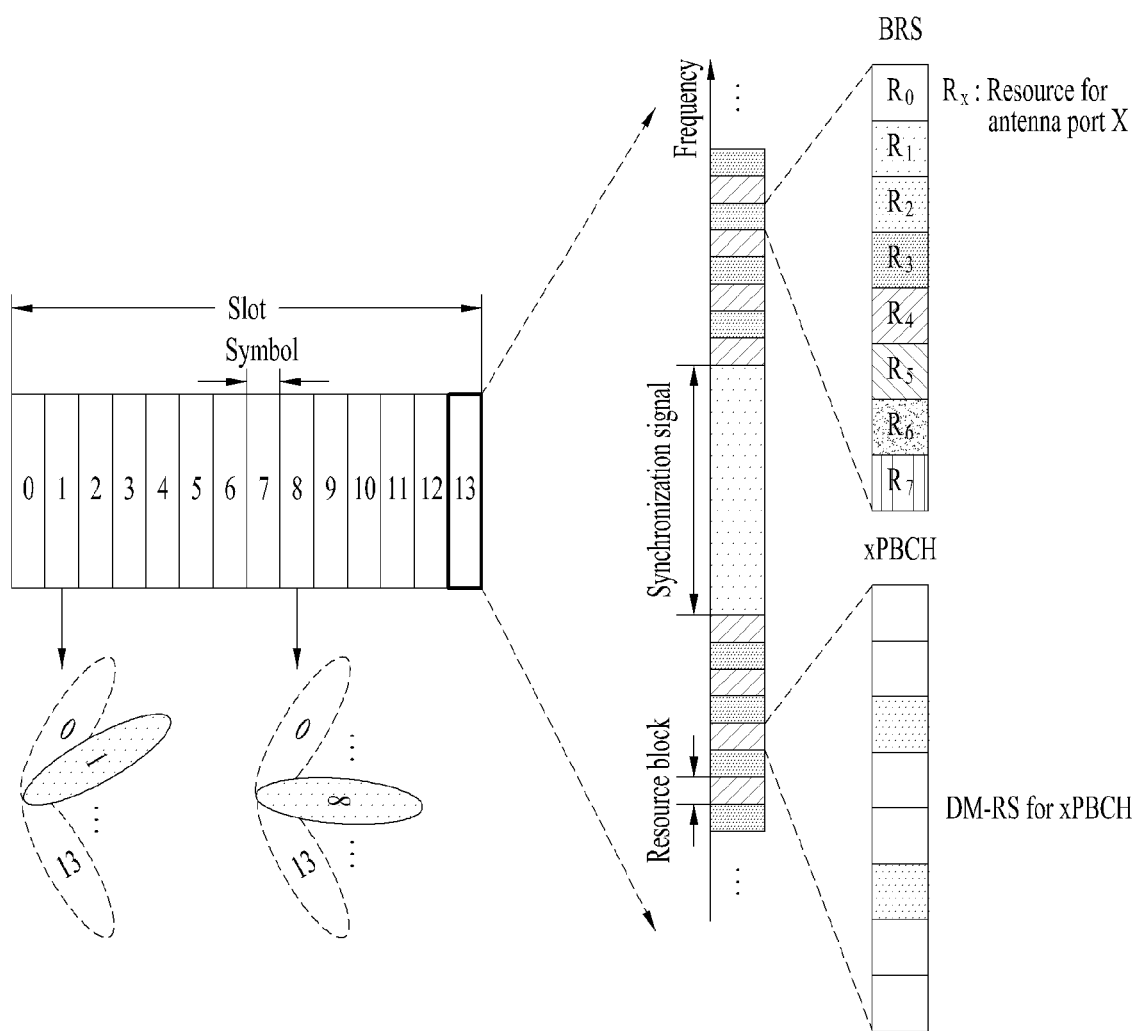
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
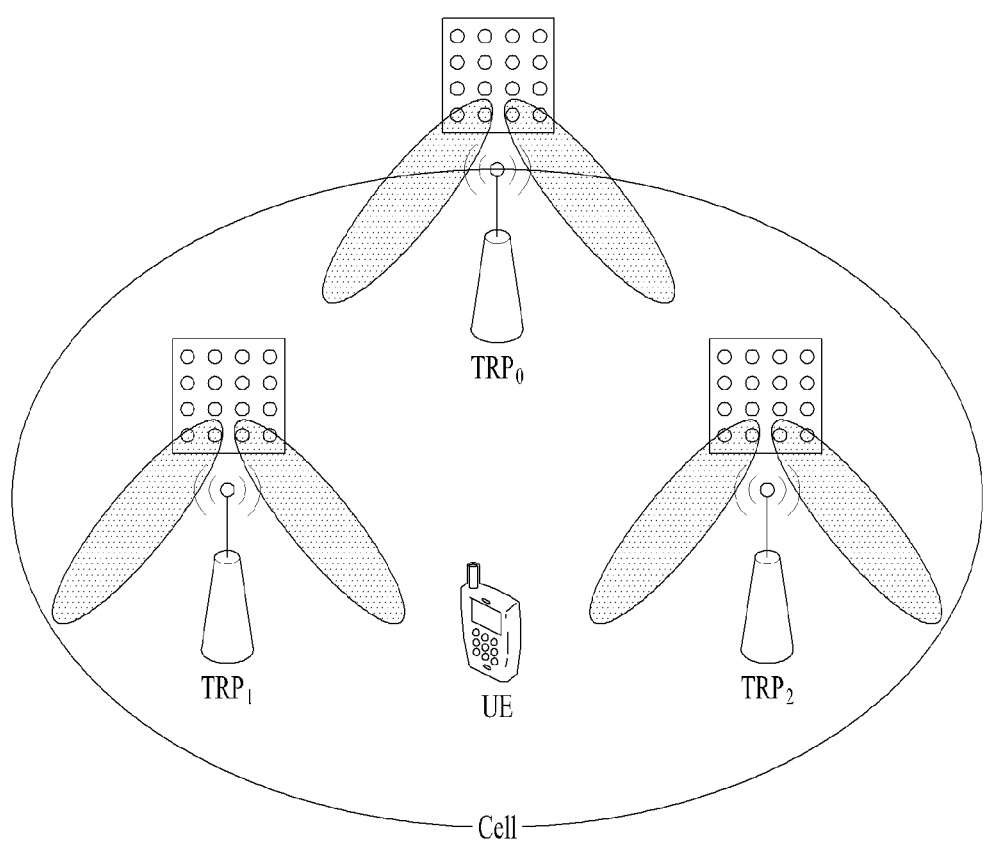
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

In the following, a method of indicating a time index at which a synchronization signal is transmitted and a method of configuring a CORESET for downlink and a bandwidth via a synchronization signal are explained according to embodiments of the present invention.

1. SS/PBCH Block (1) Information on an SS/PBCH Block Actually Transmitted on a Band Equal to or Wider than 6 GHz is Indicated in a Compressed Form.

A network forwards information on an actually transmitted SS/PBCH block to a user equipment (UE) via RMSI (Remaining Minimum System Information) using total 16 bits including Group-Bitmap (8 bits) and Bitmap in Group (8 bits). This is designed in consideration of balance between signaling overhead and flexibility. Although there are alternatives for transmitting information on an actually transmitted SS/PBCH block using the number of bits less than the total 16 bits, the alternatives have less flexibility in representing the information on the actually transmitted SS/PBCH block. In particular, it is necessary for the network to flexibly allocate resources for transmitting the information on the actually transmitted SS/PBCH block based on a UE status and a deployment scenario. In this case, since a group-bitmap scheme has a bitmap within a group and is able to provide flexibility using a bit size smaller than that of the alternatives, the group-bitmap scheme can be regarded as the most suitable method for transmitting the information on the actually transmitted SS/PBCH block.

Meanwhile, the RMSI corresponds to system information obtained by a UE by decoding MIB included in the PBCH. The RMSI is also referred to as SIB1 (System Information Block 1).

(2) SS/PBCH Block Design

Figure 9:
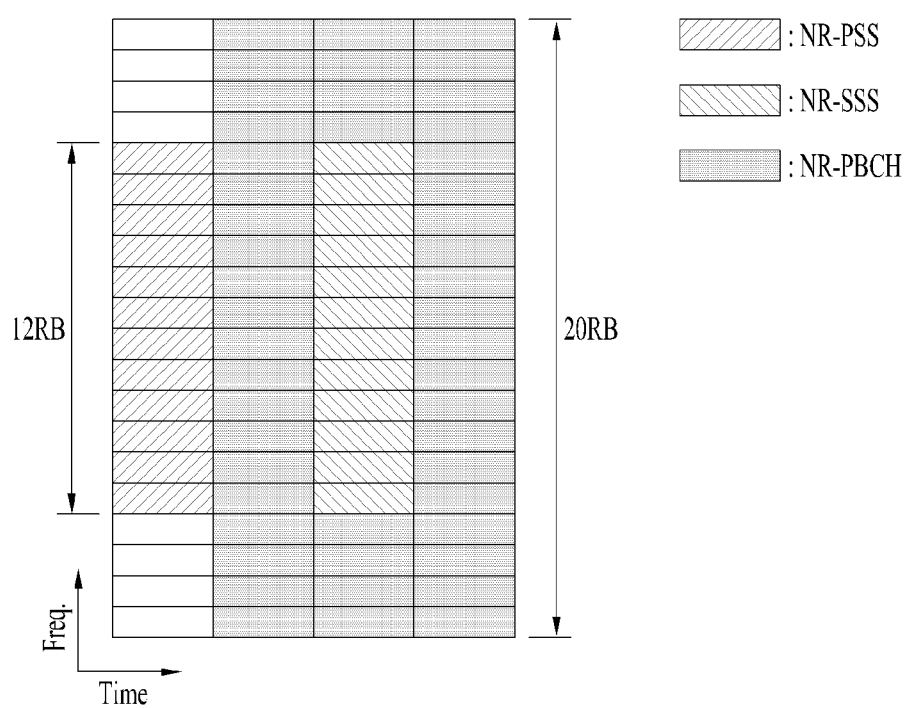
FIGS. 9 to 10 are diagrams for explaining embodiments of multiplexing a PSS/SSS/PBCH included in a synchronization signal.

It is able to design an SS/PBCH block using a bandwidth of 20 RBs to have an advantage that the number of SS entries is to be less. And, it is able to apply a mapping rule that identically maps data and a DMRS in an order of frequency-time. FIG. 9 illustrates the design of SS/PBCH blocks.

Referring to FIG. 9, since the remaining PRBs to which an SSS is not mapped are used for PBCH transmission in the third OFDM symbol, power boosting for transmitting the SSS is not applied to the remaining PRBs. Hence, EPRE offset between an SSS RE and a PBCH DM-RS RE is determined by 0 dB. As a result, it may not be unable to guarantee that a cell-ID is detected at a time. If detection capability of a cell-ID is guaranteed, it is able to apply the 0 dB EPRE offset between the SSS RE and the PBCH DM-RS RE.

Meanwhile, in the PBCH according to FIG. 9, the number of REs for PBCH transmission corresponds to 576 identical to an SS/PBCH block design of which the number of PRB bandwidths corresponds to 24. Although decoding capability of PBCH according to FIG. 9 is anticipated to be the same with the SS/PBCH block design of which the number of PRB bandwidths corresponds to 24 under the assumption that DMRS density and DMRS mapping of the PBCH are identical to the original SS/PBCH design, if PBCH DMRS is used in the third OFDM symbol, it is unable to maintain channel estimation capability. Hence, it is difficult to expect that the SS/PBCH block design according to FIG. 9 has decoding capability identical to decoding capability of the SS/PBCH block of which the number of PRB bandwidths corresponds to 24. Hence, in order to enhance the PBCH decoding capability, it may consider a PBCH DMRS mapping method described in the following.

DMRS density: 4 REs per RB according to symbol
DMRS mapping
    Equal density mapping for the second and fourth symbols of SS/PBCH block
    No DMRS mapping for the third symbol of SS/PBCH block The abovementioned alternative can provide channel estimation capability and PBCH decoding capability better than the SS/PBCH block according to FIG. 9.

(3) Evaluation Result

PBCH decoding capabilities of the aforementioned alternatives are compared each other with reference to FIGS. 10 to 13. In the evaluation of the PBCH decoding capability, assume that default periodicity (i.e., 20 ms) of an SS burst set is used and an encoded bit is transmitted within 80 ms. Detail assumption on the simulation is shown in [Table 1] in the following.

TABLE 1

| Parameter | Value |
|---|---|
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element |
| | UE: (1, 1, 2) with Omni-directional antenna element |
| Frequency Offset | 0% of subcarrier spacing |
| Default period | 20 ms |
| Subframe duration | 1 ms |
| OFDM symbols in SF | 14 |
| Number of interfering TRPs | 1 |
| Operating SNR | −6 dB |

The SS/PBCH block design is explained in detail in the following.

Figure 10:
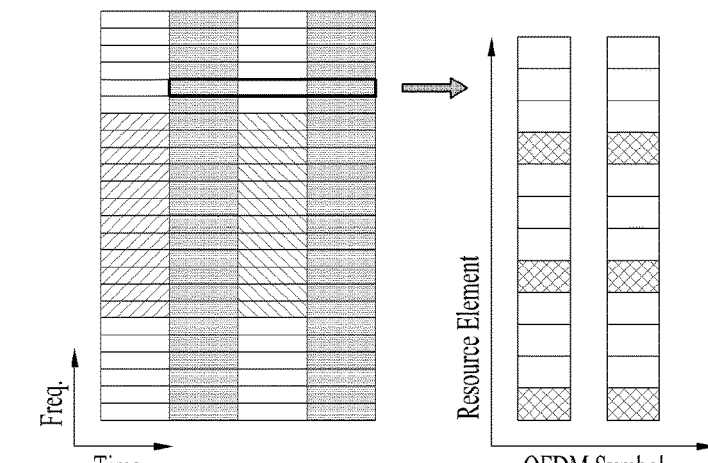
Figure 10:
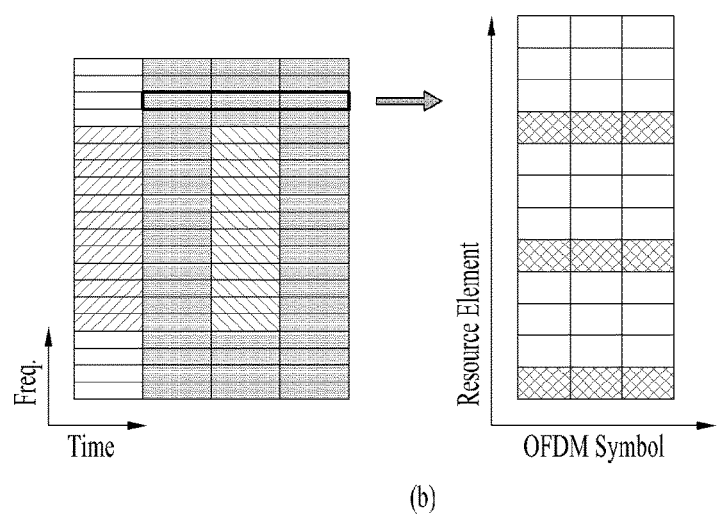
Figure 10:
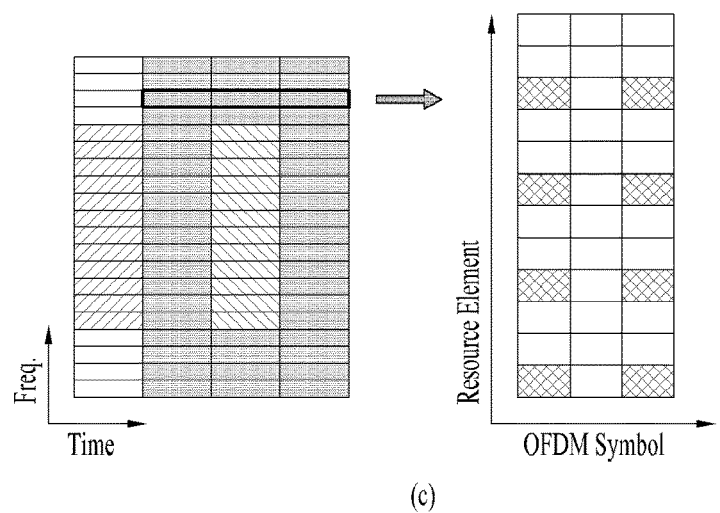

1) Alternative 1 (FIG. 10 (a)): Two OFDM symbols using 24 RBs are used to transmit NR-PBCH. In particular, the NR-PBCH is transmitted in the second and fourth OFDM symbols of the SS/PBCH block using 24 RBs (total 48 RBs).
    DMRS density: 3REs per RB according to symbol
    DMRS mapping: Equal density mapping for the second and fourth symbols of SS/PBCH block
    Number of REs of DMRS: 144

2) Alternative 2 (FIG. 10 (b)): NR-PBCH is transmitted via the second and fourth OFDM symbols (two symbols each of which has 20 RBs) of an SS/PBCH block and the third OFDM symbol (an OFDM symbol having 8 RBs) of the SS/PBCH block (total 48 RBs)
    DMRS density: 3REs per RB according to symbol
    DMRS mapping: Equal density mapping for the second, the third, and the fourth symbols of SS/PBCH block
    Number of REs of DMRS: 144

3) Alternative 3 (FIG. 10 (c)): NR-PBCH is transmitted via the second and fourth OFDM symbols (two symbols each of which has 20 RBs) of an SS/PBCH block and the third OFDM symbol (an OFDM symbol having 8 RBs) of the SS/PBCH block (total 48 RBs)
    DMRS density: 4REs per RB according to symbol
    DMRS mapping: Equal density mapping for the second and fourth symbols of SS/PBCH block (No DMRS mapping for the third symbol of the SS/PBCH block)
    Number of REs of DMRS: 160

Figure 11:
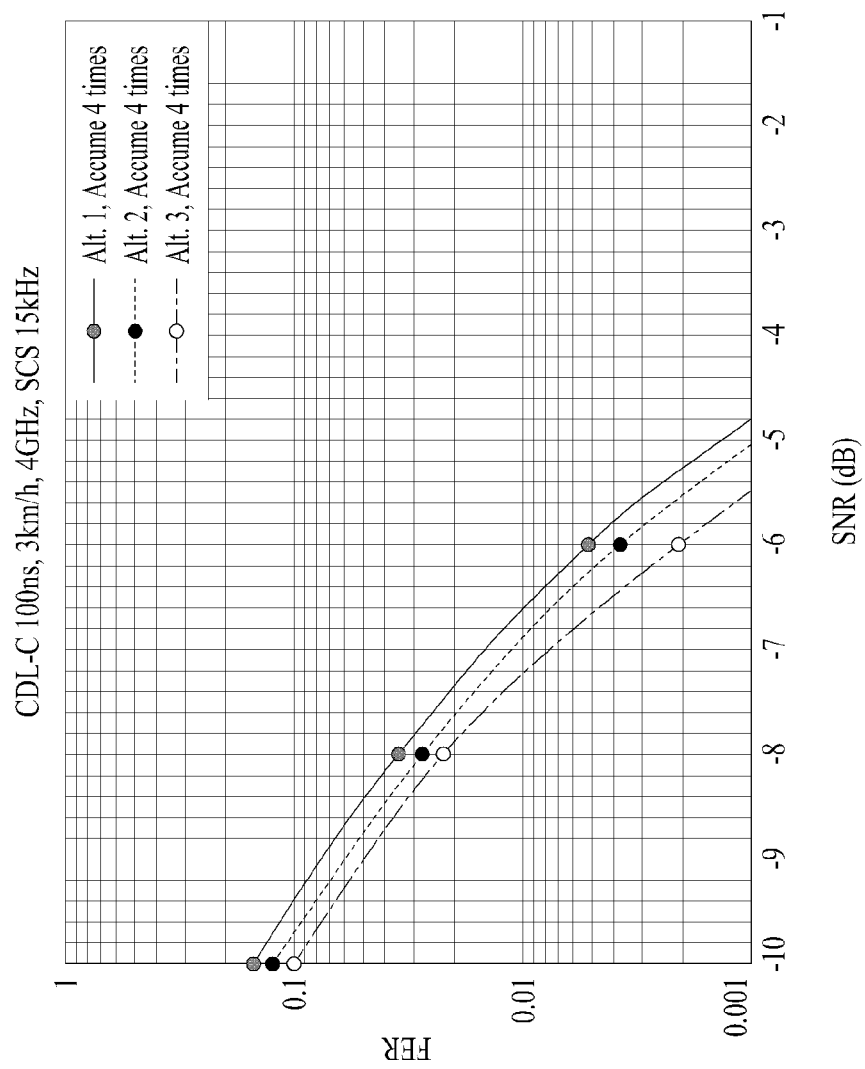
FIGS. 11 to 13 are graphs illustrating a simulation result of PBCH decoding performance according to embodiments of the present invention.
Figure 12:
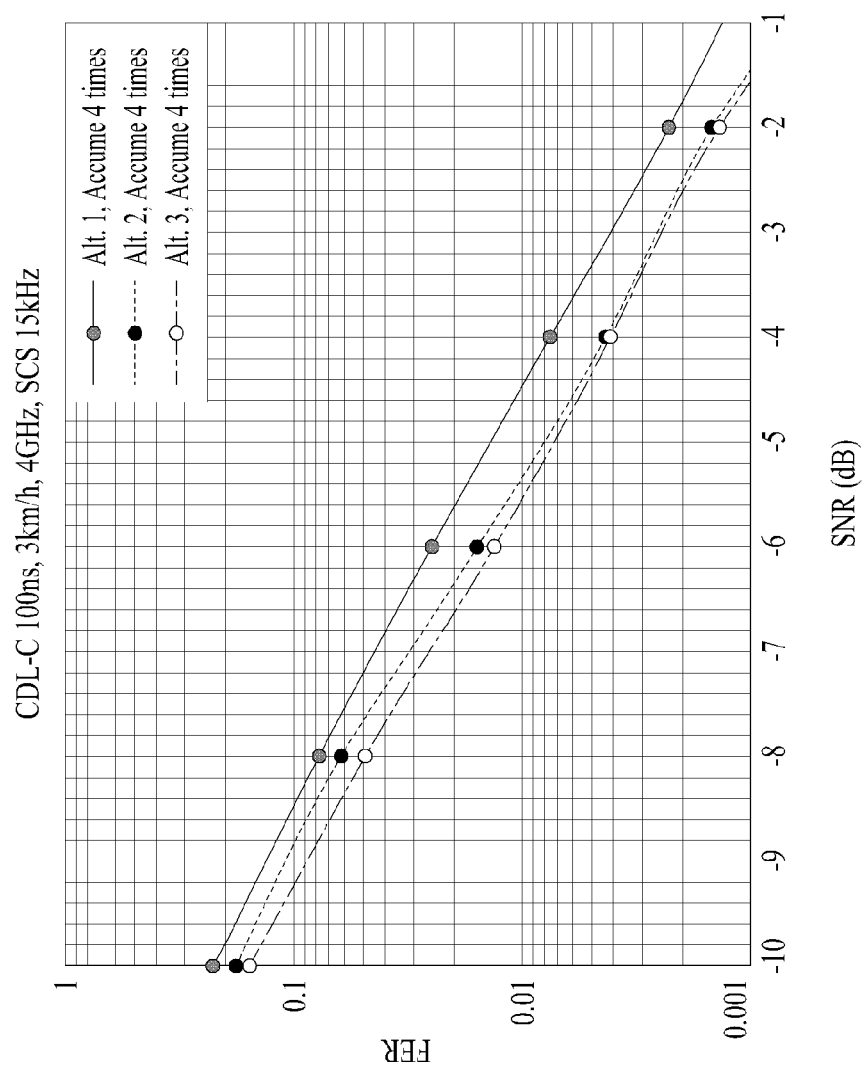

Referring to FIGS. 11 to 12, it is able to see that the alternative 2 provides worse performance compared to the alternatives 1 and 3. The reason why the decoding capability is lost is because the channel estimation capability of a DMRS of the third symbol is degraded. Meanwhile, among the three alternatives, the alternative 3 shows the best DMRS decoding capability. The capability enhancement is obtained because DMRS arrangement of the alternative 3 is able to obtain more accurate channel information compared to DMRS arrangements of the alternatives 1 and 2.

(4) Channel Raster and Synchronization Raster

In NR, a channel raster of 100 kHz is used in the maximum 2.65 GHz frequency range. And, a synchronization raster is determined based on an equation of 'N*900 kHz+M*5 kHz'. In other word, the synchronization raster is determined by {895, 900, 905, 1795, 1800, 1805, 2695, 2700, 2705 . . . , 2649.605} kHz). In particular, there are 3 synchronization raster candidates every 900 kHz. In this case, it is necessary for a UE to obtain a precise frequency position of an SS/PBCH block. This is because, if the UE fails to obtain the precise frequency positon of the SS/PBCH block, time drifting may occur as much as maximum 10 kHz offset and a problem may occur when the UE performs a sleep-wake up process in a DRX mode.

As a method for obtaining the precise frequency position of the SS/PBCH block, the UE may detect an SSS signal and perform PBCH decoding based on a plurality of hypotheses. However, if there is no considerable difference in detection capability among the 3 synchronization raster candidates which are positioned every 900 kHz, it is not easy for the UE to obtain the precise position information of the SS/PBCH block by detecting the SSS signal and performing PBCH decoding. For example, since the maximum 10 kHz offset due to the channel raster is similar to 10 kHz frequency offset effect, detection capability of the UE might be degraded. However, the UE can still detect a cell ID and an SS/PBCH block time index and perform the PBCH decoding. In particular, it is not easy to know position information of a synchronization raster candidate to which the cell ID and the SS/PBCH block time index detected by the UE and a result of the PBCH decoding belong thereto.

If it is necessary for the UE to know 5 kHz offset of a synchronization raster, a network can indicate M values (+1, 0, −1) to the UE. In particular, the indication of the M values is essential for an LTE Re-farming band. Since it is preferable to inform the UE of the M values in an early stage of an initial access, the network can indicate the M values to the UE using MIB or RMSI. For example, when the M values are indicated using the MIB, it may use 2 bits for the M values. In this case, 4 states represented by the 2 bits can include −1, 0, +1, and NULL (NULL is used in a frequency range equal to or wider than 2.4 GHz).

Meanwhile, configuration of the M values is described in [Table 2] in the following.

TABLE 2

| Code word | Offset |
| --- | --- |
| 00 | −5 kHz (M = −1) |
| 01 | 0 kHz (M = 0) |
| 10 | 5 kHz (M = 1) |
| 11 | NULL |

(5) Indication of M Value for Defining Synchronization Raster in FR1

As mentioned in the foregoing description, a base station indicates M values to a UE to define a synchronization raster for an FR1 (i.e., 0, ±1). However, if the minimum distance between adjacent synchronization rasters is greater than an initial frequency offset allowable value, the indication of the M values is not necessary anymore. In particular, if the minimum distance has a shift value of +/−100 kHz, since the UE performs an operation of detecting a synchronization signal in all synchronization rasters, the indication of the M values is not necessary anymore.

Figure 13:
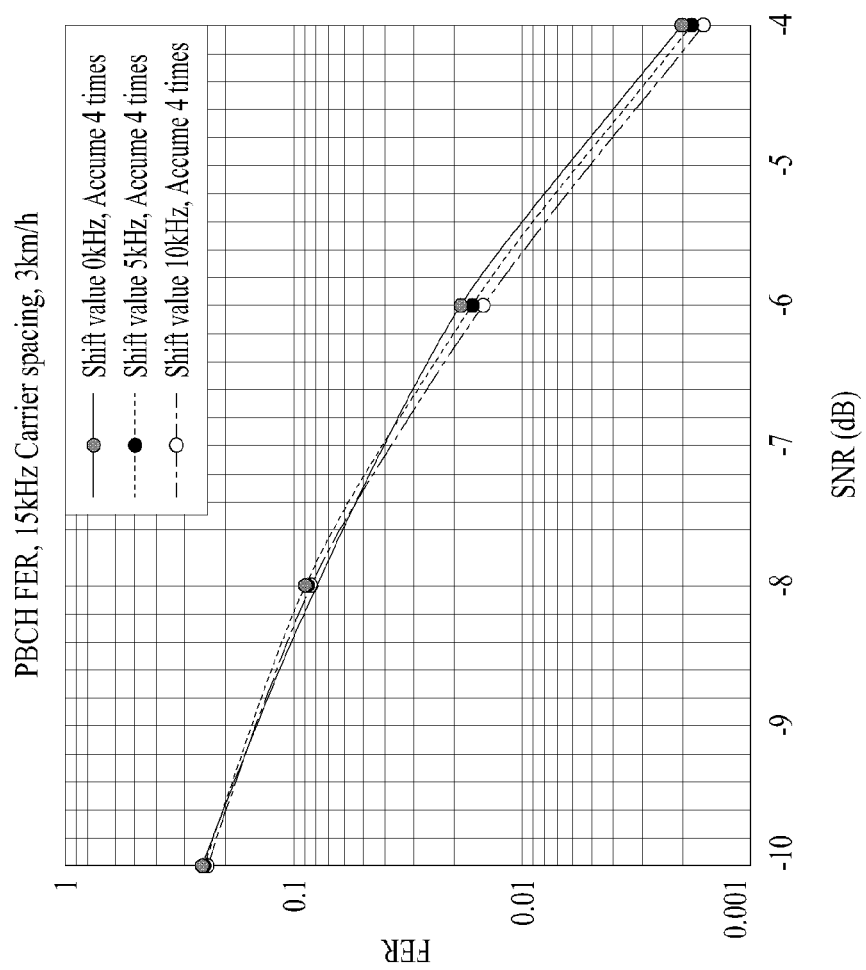

However, if the shift value (i.e., +/−5 kHz) is maintained or is changed into +/−10 kHz, an indicator of the M value should be included in the RMSI. Since an NR UE is equipped with capability capable of detecting a shift value and a frequency offset at the same time on bands up to 2.4 GHz frequency band corresponding to LTE re-farming band, it is able to guarantee PBCH decoding capability and PDSCH decoding capability. FIG. 13 illustrates PBCH decoding capability when it is assumed that a shift value corresponds to 5 kHz or 10 kHz.

As shown in FIG. 13, synchronization raster shift values 5 kHz and 10 kHz provide PBCH decoding capability almost the same with a shift value 0 kHz. Since the sum of a CFO and a shift value is within a CFO estimation range of a UE, the CFO and the shift value can be detected by the UE. And, it is able to guarantee the same PDSCH decoding capability irrespective of a shift value. For this reason, both 5 kHz and 10 kHz are suitable for a shift value in terms of capability.

When a UE detects a synchronization signal from a single synchronization raster among a cluster of 3 synchronization rasters having a different shift value, the UE can reduce the number of hypotheses for detecting a synchronization signal.

(6) Multiple SS/PBCH Blocks in Frequency Domain

A UE can receive and detect an SS/PBCH block in which RMSI does not exist. Signaling indicating that the RMSI does not exist can be forwarded using MIB. When the UE detects the signaling indicating that the RMSI does not exist in an initial access procedure, the UE should check a synchronization raster to search for an SS/PBCH block in which the RMSI exists. If the corresponding RMSI does not exist in a next SS/PBCH block, the UE should consistently check a next synchronization raster.

In particular, in order to efficiently perform a synchronization process, when the signaling indicating that the RMSI does not exist is received at an early stage, it is preferable to indicate a frequency position of an SS/PBCH block in which RMSI exists. Meanwhile, since it is not necessary for MIB of an SS/PBCH block in which RMSI does not exist to include 8 bits for configuring an RMSI CORESET, the MIB can be used for indicating a frequency position of an SS/PBCH block in which the RMSI exists. For example, 8 bits can indicate a frequency position of a synchronization raster at which an SS/PBCH block is positioned.

2. OFDM Waveform Generation (1) Waveform

In NR system, a bandwidth of an active BWP (Bandwidth Part) and a carrier frequency configured for a UE may differ from a bandwidth and a carrier frequency of an gNB. In this case, since a period of a carrier frequency is not aligned with an OFDM symbol boundary, symbols are rotated with a different phase and it makes symbol recovery to be difficult.

Phase rotation according to symbol corresponds to $f_{Tx} = N_{Tx} \cdot \Delta_f + \Delta_{offset}$ and $f_{Rx} = N_{Rx} \cdot \Delta_f + \Delta_{offset}$, it may satisfy $2\pi \Delta_f (N_{Tx} - N_{Rx}) \cdot (t_{start,j} + N_{CP,i}^H T_c)$.

In particular, in order to solve the aforementioned problem, it is necessary to compensate for a phase. In order to compensate for a phase, it may be able to generate an OFDM symbol. The OFDM symbol can be generated by 3 options described in [Table 3] in the following.

TABLE 3

Tx signal:

$$x^{(p,\mu)}(t) = s_l^{(p,\mu)}(t) \cdot e^{j2\pi f_{Tx}t} = \sum_{k=0}^{N_{RB}^\mu N_{sc}^{RB}-1} a_{k,l}^{(p,\mu)} \cdot e^{j2\pi(k+k_0-N_{RB}^\mu N_{sc}^{RB}/2)\Delta f(t-t_{start,l}-N_{CP,l}^\mu T_c)} \cdot e^{j2\pi f_{Tx}t}$$

Rx signal:

$$\hat{x}^{(p,\mu)}(t) = x^{(p,\mu)}(t) \cdot e^{-j2\pi f_{Rx}t} = \sum_{k=0}^{N_{RB}^\mu N_{sc}^{RB}-1} a_{k,l}^{(p,\mu)} \cdot e^{j2\pi(k+k_0-N_{RB}^\mu N_{sc}^{RB}/2)\Delta f(t-t_{start,l}-N_{CP,l}^\mu T_c)} \cdot e^{j2\pi(f_{Tx}-f_{Rx})t}$$

$$\hat{x}^{(p,\mu)}(t) = \sum_{k=0}^{N_{RB}^\mu N_{sc}^{RB}-1} a_{k,l}^{(p,\mu)} \cdot e^{j2\pi(k+k_0-N_{RB}^\mu N_{sc}^{RB}/2)\Delta f(t-t_{start,l}-N_{CP,l}^\mu T_c)} \cdot e^{j2\pi(f_{Tx}-f_{Rx})t}$$

$$= \sum_{k=0}^{N_{RB}^\mu N_{sc}^{RB}-1} a_{k,l}^{(p,\mu)} \cdot \left\{ \begin{array}{l} e^{j2\pi(k+k_0-N_{RB}^\mu N_{sc}^{RB}/2)\Delta f(t-t_{start,l}-N_{CP,l}^\mu T_c)} \cdot \\ e^{j2\pi\Delta f(N_{Tx}-N_{Rx})\cdot(t-t_{start,l}-N_{CP,l}^\mu T_c)} \end{array} \right\} \cdot e^{j2\pi\Delta f(N_{Tx}-N_{Rx})\cdot(t-t_{start,l}-N_{CP,l}^\mu T_c)}$$

$$= \sum_{k=0}^{N_{RB}^\mu N_{sc}^{RB}-1} a_{k,l}^{(p,\mu)} \cdot \left\{ \begin{array}{l} e^{j2\pi(k+k_0-N_{RB}^\mu N_{sc}^{RB}/2)\Delta f(t-t_{start,l}-N_{CP,l}^\mu T_c)} \cdot \\ e^{j2\pi\Delta f(N_{Tx}-N_{Rx})\cdot(t-t_{start,l}-N_{CP,l}^\mu T_c)} \end{array} \right\} \cdot e^{j2\pi\Delta f N_{Tx,comp}\cdot(t_{start,l}+N_{CP,l}^\mu T_c)} \cdot e^{-j2\pi\Delta f N_{Rx,comp}\cdot(t_{start,l}+N_{CP,l}^\mu T_c)}$$

$$= \sum_{k=0}^{N_{RB}^\mu N_{sc}^{RB}-1} a_{k,l}^{(p,\mu)} \cdot \left\{ \begin{array}{l} e^{j2\pi(k+k_0-N_{RB}^\mu N_{sc}^{RB}/2)\Delta f(t-t_{start,l}-N_{CP,l}^\mu T_c)} \cdot \\ e^{j2\pi\Delta f(N_{Tx}-N_{Rx})\cdot(t-t_{start,l}-N_{CP,l}^\mu T_c)} \end{array} \right\} \cdot e^{j\psi_{Tx}} \cdot e^{-j\psi_{Rx}}$$

where $f_{Tx} = N_{Tx} \cdot \Delta_f + \Delta_{offset}$, $f_{Rx} = N_{Rx} \cdot \Delta_f + \Delta_{offset}$
$e^{j\psi_{Tx}}$ : Tx side compensation
$e^{j\psi_{Tx}}$ : Rx side compensation
Option 1 & 2

$N_{Tx,comp} = N_{Tx} - N_{Rx}$, $N_{Rx,comp} = 0$, for SS/PBCH block and RMSI
$N_{Tx,comp} = 0$, $N_{Rx,comp} = N_{Tx} - N_{Rx}$, for other signals and channels
Option 3 a) $N_{Tx,comp} = N_{Tx}$, $N_{Rx,comp} = N_{Rx}$ could be used.
b) However, any values could be used
only if $N_{Tx,comp} - N_{Rx,comp} = N_{Tx} - N_{Rx} + N \times 2^\mu \cdot 1.92$ MHz.
$N_{Tx} = \text{mod}[\text{round}\{f_{Tx}/2^\mu \cdot 15 \text{ kHz}\}, 128]$
$N_{Rx} = \text{mod}[\text{round}\{f_{Rx}/2^\mu \cdot 15 \text{ kHz}\}, 128]$
where $N \times 2^\mu \cdot 1.92$ MHz is the reference point and the N is derived
from the closest frequency among multiple of $2^\wedge \mu$ 1.92 MHz.
In this case, the range of $N_{Tx}$ and $N_{Rx}$ is from −64 to 63.

The three options are almost the same. A main solution for the aforementioned problem is to separate phase compensation from phase discontinuity.

As mentioned in the options 1 and 2, the phase compensation can be performed in either a transmitting side or a receiving side. Or, as mentioned in the option 3, the phase compensation can be performed in both sides. In this case, it may use carrier frequency information of an opposite side. In order to select an efficient option from among the three options, it is preferable to select the options 1 and 2. This is because, if carrier frequency information of one side is known, another side is able to compensate for a phase.

In other word, a phase is compensated in advance by a gNB having a pre-assumption of a carrier frequency used by a UE and the UE does not need to perform an additional operation for phase compensation.

(2) OFDM Waveform Generation

In NR system, since a carrier frequency of a transmitter may not be matched with a carrier frequency of a receiver. Hence, a signal phase may rapidly change in all symbols. In order to solve a problem of an OFDM waveform due to the radical change of the signal phase, a phase of an un-quantized carrier frequency can be reconfigured by a value determined at an OFDM symbol boundary. And, an up-conversion equation for all channels/signals except a PRACH can be calculated according to [Equation 1] described in the following.

$$\hat{x}^{(p,\mu)}(t) = \sum_{k=0}^{N_{grid}^{size,\mu} N_{sc}^{RB}-1} a_{k,l}^{(p,\mu)} \cdot \left\{ e^{j2\pi(k+k_0-N_{grid}^{size,\mu} N_{sc}^{RB}/2)\Delta f(t-t_{start,l}-N_{CP,l}^\mu T_c)} \right\} \cdot e^{j2\pi f_{Tx}(t-t_{start,l}-N_{CP,l}^\mu T_c)}$$ [Equation 1]

Meanwhile, in relation to the aforementioned waveform generation, there are +/−5 kHz shift value compensation problem within a synchronization raster cluster and a UE implementation complexity problem. Regarding this, it shall be explained in detail in the following.

(3) Compensation of +/−5 kHz Shift Value within Synchronization Raster Cluster

In case of the aforementioned option 3b, since +/−5 kHz shift value is naturally compensated by AFC within a synchronization raster cluster, it may determine that it is necessary for the option 3a to have the number of PBCH/RMSI detectors greater than the number of PBCH/RMSI detectors of the option 3b. However, in case of the option 3a, although +/−5 kHz shift value shows a small capability difference, which is anticipated not to degrade PBCH/RMSI detection capability, a phase difference is measured within an OFDM symbol. Hence, the option 3a does not need to have multiple PBCH/RMSI detectors.

In order to support 30 kHz subcarrier spacing on LTE re-farming band, there is a necessity to change a shift value into +/−10 kHz shift value. However, according to the evaluation result mentioned earlier in FIG. 13, when +/−10 kHz shift value is assumed, it is able to see that PBCH detection capability deterioration is insignificant. In particular, it is able to see that the option 3b has no significant merit in the aspect of shift value compensation.

However, in case of considering a shift value (e.g., +/−100 kHz) greater than the aforementioned shift value as a shift value candidate, it is necessary to have multiple PBCH/RMSI detectors or intra-symbol frequency offset estimators to implement the options 3a and 3b.

(4) UE Implementation Complexity

Phase reconfiguration complexity or phase compensation complexity for an un-quantized carrier frequency may be greater than that of one selected from among quantized carrier frequencies. In this case, the one selected from among the quantized carrier frequencies may use a synchronization raster, which is positioned in the vicinity of an absolute DC point determined in a synchronization raster according to the option 3b, as a common reference point. However, values calculated according to the aforementioned options may not be accurate depending on an UE implementation method. In order to compare UE implementation complexities each other, three methods for UE implementation are analyzed in the following.

Method 1) Phase reconfiguration (phase pre-compensator)
Method 2) Free-running oscillator and digital frequency converter
Method 3) FFT resource mapping Before the UE implementation method is explained, a carrier frequency for up-conversion can be represented as [Equation 2] described in the following.

$$f_{Tx} = N_{Tx} \cdot \Delta f + \Delta_{offset} = N_{group} \cdot 128 \Delta f + N_{offset} \cdot \Delta f + \delta = f_{group} + f_{offset} + \delta$$ [Equation 2]

In this case, $f_{Tx}$ is a carrier frequency for up-conversion, $\Delta f$ is carrier spacing, $|\delta| < \Delta f$, $N_{group} = \lfloor N_{Tx}/128 \rfloor$, and $0 \leq N_{offset} < 128$.

For reference, it is necessary to find out the minimum frequency of which one OFDM symbol space including a CP satisfies an integer cycle number as numerology defined in an NR system. According to the definition, a GCD of {144, 160, 2048} corresponds to 16 and a frequency having a cycle of 16 samples corresponds to $2048/16 \cdot \Delta f = 128 \Delta f$. In particular, $128 \Delta f$ (basic frequency of $f_{group}$) corresponds to a basic frequency not generating a phase change over OFDM symbols different from each other during up-conversion.

1) Method 1: Phase Reconfiguration (Phase Pre-Compensator)

Figure 14:
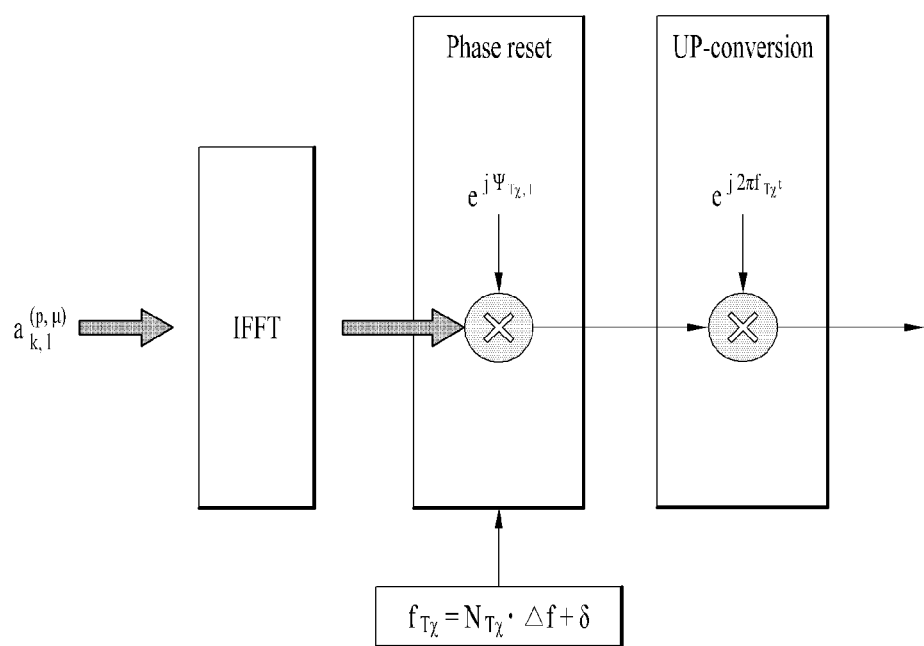
FIGS. 14 to 16 are diagrams for explaining implementation embodiments of a UE to perform embodiments of the present invention.

An amount of phase ramping can be compensated in advance before up-conversion is performed by a free-running oscillator. This can be represented as [Equation 3] and FIG. 14. Meanwhile, [Equation 3] can be induced based on the [Equation 1].

$$\hat{x}^{(p,\mu)}(t) = \sum_{k=0}^{N_{grid}^{size,\mu} N_{sc}^{RB}-1} a_{k,l}^{(p,\mu)} \cdot$$ [Equation 3]

$$\left\{ e^{j2\pi(k+k_0-N_{grid}^{size,\mu} N_{sc}^{RB}/2)\Delta f(t-t_{start,l}-N_{CP,l}^{\mu} T_c)} \cdot e^{j\Psi_{Tx,l}} \right\} \cdot$$

$$e^{j2\pi f_{Tx} t}$$

In this case, $\Psi_{Tx,l} = -2\pi f_{Tx} \cdot (t_{start,l} + N_{CP,l}^{\mu} T_c) = -2\pi (N_{offset} \Delta f + \delta) \cdot (t_{start,l} + N_{CP,l}^{\mu} T_c)$ is satisfied.

Meanwhile, according to the [Equation 2] and the [Equation 3], since $0 \leq N_{offset} < 128$, $\delta = 0, \pm 5$ kHz, and $e^{j2\pi f_{group} \cdot (t_{start,l} + N_{CP,l}^{\mu} T_c)} = 1$ are satisfied, it is necessary for a phase pre-compensator to have 128*3=384 patterns for an up-conversion frequency.

2) Method 2: Free-Running Oscillator and Digital Frequency Converter

The [Equation 1] can be represented as [Equation 4] described in the following using $f_{group}$. In this case, the $f_{group}$ corresponds to a carrier frequency for performing up-conversion to avoid phase discontinuity from a free-running oscillator. In addition, a digital oscillator is used as a residual frequency shift $f_{Tx}$ in addition to up-conversion of an analog oscillator. In this case, the $f_{Tx}$ is easily provided by a function for phase reconfiguration at all OFDM symbol boundaries.

$$\hat{x}^{(p,\mu)}(t) =$$ [Equation 4]

$$\sum_{k=0}^{N_{grid}^{size,\mu} N_{sc}^{RB}-1} a_{k,l}^{(p,\mu)} \cdot \left\{ e^{j2\pi(k+k_0-N_{grid}^{size,\mu} N_{sc}^{RB}/2)\Delta f(t-t_{start,l}-N_{CP,l}^{\mu} T_c)} \cdot e^{j2\pi(N_{offset}\Delta f+\delta)(t-t_{start,l}-N_{CP,l}^{\mu} T_c)} \right\} \cdot e^{j2\pi f_{group} t}$$

3) Method 3: FFT Resource Mapping

Figure 15:
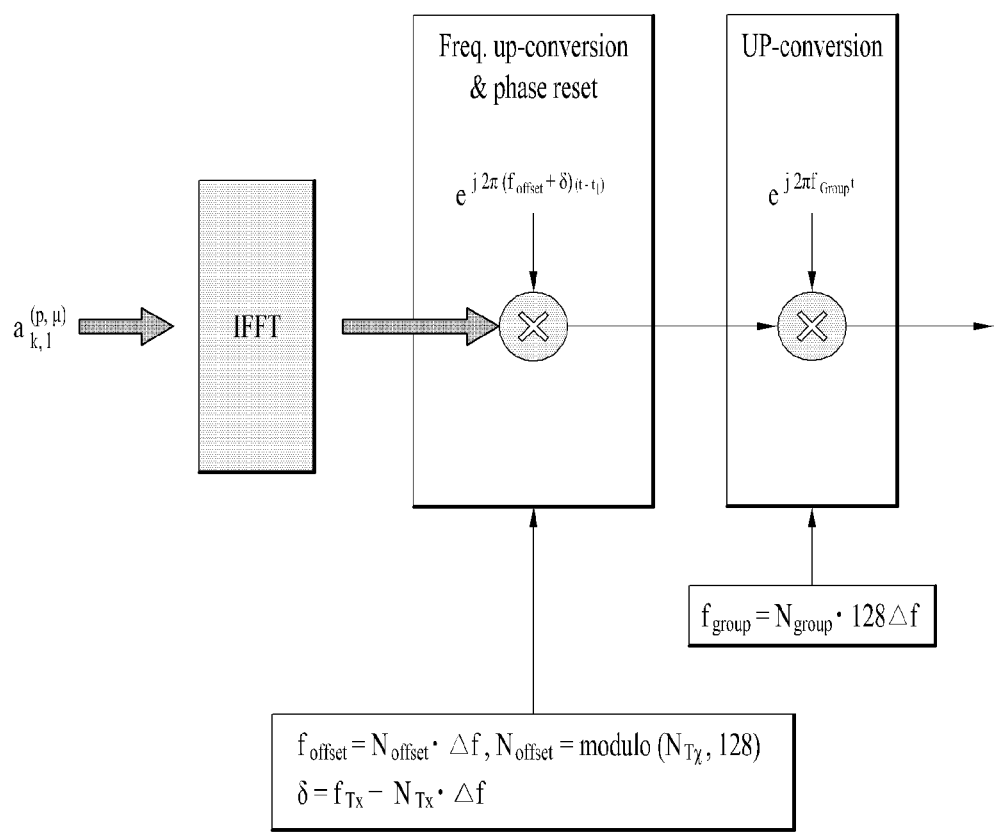
Figure 16:
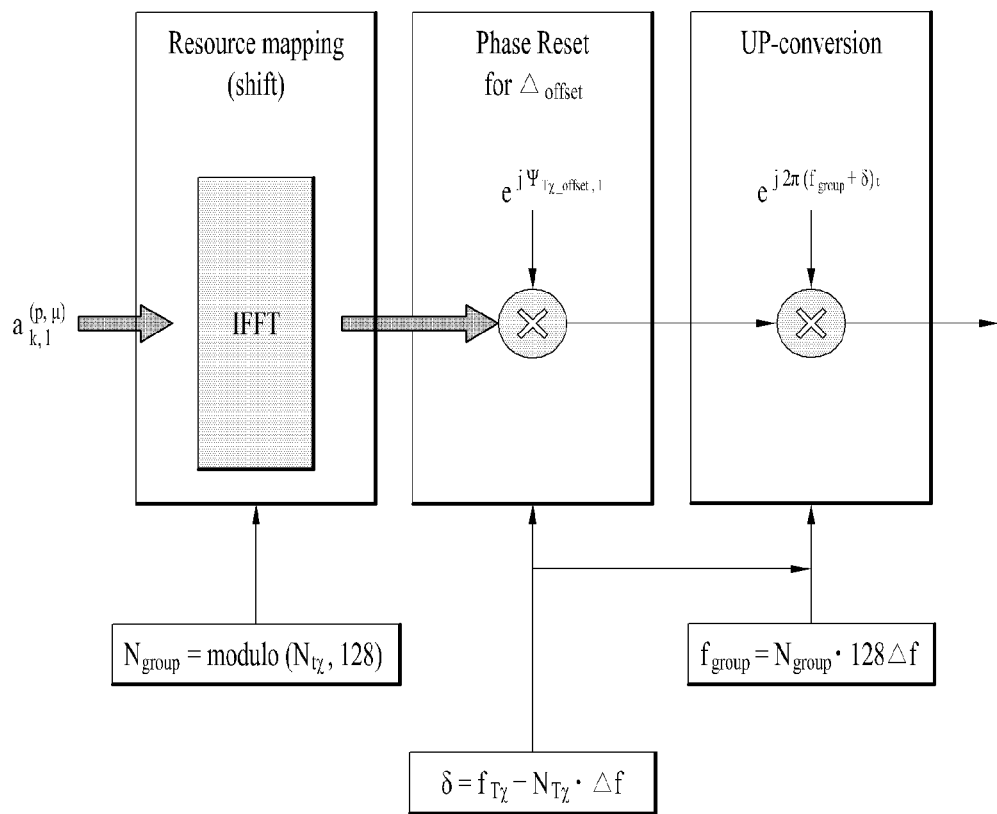

In the aforementioned method 2, as illustrated in FIG. 15, a conversion frequency of the digital oscillator can be divided into $f_{offset}$ and $\delta$. In this case, the $f_{offset} = N_{offset} \cdot \Delta f$ means a plurality of subcarrier spacing and corresponds to a component carrier of IFFT. Hence, a function of frequency conversion corresponding to the $f_{offset}$ can be implemented by performing resource remapping in the IFFT. In particular, the residual frequency corresponding to the $\delta$ corresponds to a component due to phase discontinuity and the residual frequency can be compensated by [Equation 5] described in the following and FIG. 16.

$$\hat{x}^{(p,\mu)}(t) = \sum_{k=0}^{N_{grid}^{size,\mu} N_{sc}^{RB}-1} a_{k,l}^{(p,\mu)} \cdot$$ [Equation 5]

$$\left\{ e^{j2\pi(k+k_0+N_{offset}-N_{grid}^{size,\mu} N_{sc}^{RB}/2)\Delta f(t-t_{start,l}-N_{CP,l}^{\mu} T_c)} \cdot e^{j\Psi_{Tx\_offset,l}} \right\} \cdot e^{j2\pi(f_{group}+\Delta_{offset})t}$$

In this case, $\Psi_{Tx\_offset,l} = -2\pi\delta \cdot (t_{start,l} + N_{CP,l}^{\mu} T_c)$ is satisfied.

In addition to the aforementioned methods, there may exist various embodiments for performing phase compensation. In particular, it may use similar methods using the free-running oscillator for the δ to implement the option 3b.

According to the aforementioned technique, if the method 1 is used for implementation, phase compensation for an un-quantized carrier frequency may require a memory storage greater than a memory storage required by a quantized phase compensation method. On the other hand, if the method 3 is used for implementation, a pattern corresponding to the δ is necessary as a weight for performing phase reconfiguration. If the δ corresponds to 0, it is not necessary to have an additional multiplication calculation for phase reconfiguration. In particular, the methods have no significant difference in the aspect of complexity depending on an implementation method. In particular, there is no significant evidence that the option 3b has a significant advantage in the aspect of shift value compensation and UE implementation complexity.

3. Timing Information Indication (1) Half Frame Indication

A half-frame indicator of 1 bit is included in a PBCH payload. When an interval of a CSI-RS for performing measurement is equal to or greater than 20 ms, a UE assumes that the CSI-RS is synchronous. And, since the maximum number of beams corresponds to 4 in a band equal to or narrower than 3 GHz band, the half-frame indicator is implicitly signaled via a PBCH DMRS.

In addition, it is necessary to have a method of checking a frame boundary on 3 to 6 GHz bands without decoding of PBCH. In order to measure an intra-frequency on 3 to 6 GHz bands, it may consider situations described in the following to indicate a frame boundary of a neighbor cell.

1) When a network configures a CSI-RS having a period equal to or greater than 20 ms, a serving cell configures a synchronization indicator as 'synchronous' and a UE may assume that the network is synchronous.

2) When the network configures a CSI-RS having periodicity of 10 ms, the serving cell provides the UE with information of "CSI-RS-Config-Mobility" and the UE can obtain information indicating whether a starting position of a candidate CSI-RS scrambling sequence corresponds to an odd-numbered 5 ms or an even-numbered 5 ms by performing correlation after an SS/PBCH block index is obtained via a PBCH DMRS sequence.

3) When the network configures a CSI-RS having periodicity of 5 ms, the serving cell provides the UE with information of "CSI-RS-Config-Mobility" and the UE can obtain information indicating whether starting positions of two candidate CSI-RS scrambling sequences correspond to an odd-numbered 5 ms or an even-numbered 5 ms by performing correlation after an SS/PBCH block index is obtained via a PBCH DMRS sequence.

4) A scrambling sequence period of a CSI-RS is defined by 5 ms.

5) If the network does not configure a CSI-RS, although the UE obtains an SSB index via a PBCH DMRS sequence, the UE is unable to distinguish an even-numbered 5 ms from an odd-numbered 5 ms.

In order to solve the problems capable of being occurred in 4) and 5), the network should always configure "CSI-RS having periodicity of 10 ms" or "CSI-RS periodicity of 5 ms having a scrambling sequence period of 10 ms". When the network is asynchronous, the serving cell should provide the UE with information of "CSI-RS-Config-Mobility".

If the network is synchronous, the serving cell should configure a synchronous indicator as "synchronous". In other word, when a CSI-RS is not configured, a scrambling sequence period of a CSI-RS is equal to less than 5 ms due to a CSI-RS period equal to or less than 5 ms, or a CSI-RS period corresponds to 20 ms, 40 ms, 80 ms, 160 ms, or 320 ms, the network should operate as 'synchronous' and the serving cell configures a synchronization indicator as 'synchronous'.

(2) Synchronization Information

In the following, a method of obtaining an SS/PBCH time index for a neighbor cell is described. Since a DMRS sequence provides performance better than performance of PBCH contents decoding, a 3-bit SS/PBCH block index is forwarded by changing the DMRS sequence within a period of 5 ms. In particular, it is able to obtain an SS/PBCH time index for a neighbor cell from an NR-PBCH DMRS on a frequency band equal to or narrower than 6 GHz. On the other hand, since 64 SS/PBCH block indexes are represented in a manner of being divided into a PBCH-DMRS and PBCH contents on a frequency band equal to or wider than 6 GHz, a UE performs decoding on a PBCH of a neighbor cell to obtain an SS/PBCH block index of the neighbor cell. However, the method above brings about additional complexity due to the decoding performed on NR-PBCH of the neighbor cell. In addition, since decoding capability of a PBCH is inferior to decoding capability using a PBCH-DMRS, there is no reason for a UE to directly perform decoding on a PBCH of a neighbor cell to obtain an SS/PBCH block index.

Hence, it may consider a method for a serving cell to provide a configuration for an SS/PBCH block index for a neighbor cell instead of a method for a UE to perform decoding on a PBCH of a neighbor cell. For example, the serving cell can provide a configuration of MSB (Most Significant Bits) (3 bits) of an SS/PBCH block index for a target neighbor cell. Subsequently, the UE can detect LSB (Least Significant Bits) (3 bits) of an SS/PBCH block index of a neighboring cell via a PBCH-DMRS of the neighboring cell. Subsequently, in order to obtain an SS/PBCH block index of the neighbor cell, the MSB (3 bits) obtained via PBCH decoding of the serving cell and the LSB (3 bits) obtained via the PBCH-DMRS of the neighbor cell are combined. By doing so, it is able to obtain an SS/PBCH block index for the target neighbor cell.

4. NR-PBCH Contents (1) Payload Size and Content

A payload size of a PBCH corresponds to 54 bits on all bands equal to or wider/narrower than 6 GHz. PBCH contents are illustrated in [Table 4] in the following.

TABLE 4

| Details | Bit size | |
| --- | --- | --- |
| | For B6 GHz | For A6 GHz |
| System Frame Number | 10 | 10 |
| Hal frame indication | 1 | 1 |
| SS/PBCH block time index (MSB) | 0 | 3 |
| PDSCH DMRS position | 1 | 1 |
| Reference numerology | 1 | 1 |
| RE level frequency position of RMSI CORESET (includes frequency offset and RB level indication) | 9 | 7 |
| Frequency resource of RMSI CORESET | 2 | 1 |
| Time resource of RMSI CORESET | 2 | 2 |

TABLE 4-continued

| | Bit size | |
|---|---|---|
| Details | For B6 GHz | For A6 GHz |
| PDCCH monitoring window duration | 1 | 1 |
| PDCCH monitoring window offset | 1 | 1 |
| cellBarred | 1 | 1 |
| intraFreqReselection | 1 | 1 |
| Reserved Bit | 2 | 2 |
| CRC | 24 | 24 |
| Total | 56 | 56 |

(2) RMSI CORESET Configuration Having Minimum Bandwidth of 10 MHz

When subcarrier spacing of an SS/PBCH block corresponds to 30 kHz, it may have an RMSI CORESET configuration based on a band of which the minimum channel bandwidth (MinCBW) corresponds to 40 MHz. In addition, it is necessary to consider whether or not a new RMSI CORESET configuration for 10 MHz MinCBW having SS/PBCH block subcarrier spacing of 15 kHz is necessary. A band 41 is defined for 10 MHz MinCBW using 15 kHz subcarrier spacing for an SS/PBCH block. Hence, it is necessary to provide an RMSI CORESET configuration that supports the band 41.

In order to reduce the number of SS entries for a wider MinCBW (i.e., 10 MHz, 40 MHz), it has been determined to adopt down selection for all candidate SS entries. In particular, when the band 41 has subcarrier spacing of 15 kHz, since a down selection value corresponds to '3', a synchronization raster value increases (i.e., 4.32 MHz). In particular, in order to support a synchronization raster of a big value for the subcarrier spacing of 15 kHz, it is necessary for NR to configure an RMSI CORESET for 15 kHz subcarrier spacing of an SS/PBCH block including 10 MHz MinCBW. When a CORESET configuration is determined, it is necessary to consider network operation flexibility based on a status of a network bandwidth. For this reason, it is necessary to design 15 kHz subcarrier spacing and an RMSI CORESET to be used for 10 MHz MinCBW to support 10 MHz BW~20 MHz BW.

Meanwhile, 4 bits for an MIB configuration are not sufficient enough for representing all candidate values for RB offsets ranging from an SS/PBCH block to an RMSI CORESET. In order to solve the problem, it may consider defining two configuration tables based on an RMSI CORESET bandwidth and selecting one from among the two configuration tables. However, when the method above is used, it may set a limit on the use of a channel bandwidth or an RMSI CORESET BW. In particular, the method may not be suitable for utilizing a network resource. Hence, it is necessary to determine an additional bit usable in MIB to dynamically select the two tables. In particular, it is able to determine 1 bit from bits reserved for indicating an SS/PBCH block index. In particular, it is able to design a new RMSI CORESET configuration table using 5 bits. In other word, 1 bit is additionally required to configure a CORESET. The 1 bit can be determined from the bits reserved for indicating an SS/PBCH block index.

(3) Information for Quickly Identifying Information Indicating that RMSI does not Exist Via PBCH In NR system, an SS block is used not only for providing information for network access but also for performing operation measurement. In particular, in order to measure a wideband CC operation, it may transmit a plurality of SS/PPCH blocks. However, if RMSI is forwarded via all frequency positions at which SS/PBCH blocks are transmitted, it may increase signaling overhead. In particular, in order to efficiently utilize a resource, it may consider forwarding RMSI via a specific frequency position. In this case, since UEs in an initial access procedure are unable to recognize whether or not system information is provided at a frequency position currently detected by the UEs, it may cause ambiguity in obtaining the system information. In order to resolve the ambiguity, as a solution, it is necessary to consider a method of defining a bit field to quickly identify that there is no RMSI corresponding to PBCH. In addition, it is necessary to consider a different solution capable of resolving the ambiguity without introducing the bit field. As a solution, there is a method of transmitting an SS/PBCH block for performing measurement at a frequency position which is not defined as a frequency raster. In this case, since the UEs in the initial access procedure are unable to detect an SS/PBCH block, it is able to resolve ambiguity for whether or not RMSI exists.

A specific embodiment for the method above is described in the following. In order to make an EN-DC UE of which ANR is available not to attempt to obtain system information at a frequency position where the system information does not exist, a code point (e.g., all-zeros) can be defined as "SIB1 does not exist". In this case, a main object of defining the code point is to avoid overhead due to an additional bit.

As a method, a state of an RMSI search window occasion configuration consisting of 4 bits can be used as a candidate for the code point. As a different method, 2-bit fields are combined for cellBarred and intraFreqReselection and 4 states can be defined for each of the purposes. For instance, '00' denotes cellBarred, '01' denotes intraFreqReselection, '10' denotes that SIB1 is not present, and '11' can denote that SIB1 is present.

"SIB1 not present" is triggered, it is able to indicate a frequency position at which SIB1 is positioned using a different bit field of MIB. This method has a merit in that it is able to reduce UE detection complexity.

Specifically, when there is no RMSI related to an SS/PBCH block, the information is indicated using a reserved value of SSB-subcarrier-offset. When RMSI is not indicated, it may use RMSI-PDCCH-config to indicate a next synchronization raster to search for an SS/PBCH block having RMSI. In particular, it may follow a definition of an SS_PBCH_frequency position to indicate the next synchronization raster.

Meanwhile, an SS/PBCH block frequency position is defined by the lowest synchronization raster per NR operation band, a multiple of a synchronization raster and a function of a raster offset.

For example, a frequency position of an SS/PBCH block is determined by {2400 MHz+N*1.44 MHz} on FR1, is determined by {[24250.08] MHz+N*[17.28] } MHz on FR2, and is determined by {N*900 kHz+M*5 kHz} on LTE re-farming band.

The lowest synchronization raster per NR operation band can be defined using the same manner. And, RMSI-PDCCH-config is used to indicate 'N' value in every NR operation band. An MIB does not indicate an accurate value of a raster offset 'M' for a next synchronization raster. A UE performs decoding on PDSCH for RMSI at an indicated SS/PBCH block frequency position and may be then able to obtain the accurate 'M' value from the RMSI.

Meanwhile, a range of the 'N' is defined based on an NR operation band. In most cases, since 8 bits of RMSI-PDCCH-Config are sufficient enough to indicate a next synchronization raster at which corresponding RSMI is present, it is able to indicate a next synchronization raster within a range of 256 for the 'N'.

However, as illustrated in [Table 5], it is necessary to have a range equal to or greater than 256 for the 'N' on a certain band.

TABLE 5

| NR Operating Band | SS Block SCS | Mini channel BW | Number of SS entry/Lowest sync raster |
|---|---|---|---|
| n1 | 15 kHz | 5 MHz | 2109.9 MHz + 0.9*N + M*5 kHz, N = 0:63, M = −1, 0, or 1 |
| n2 | 15 kHz | 5 MHz | 1929.9 MHz + 0.9*N + M*5 kHz, N = 0:63, M = −1, 0, or 1 |
| n3 | 15 kHz | 5 MHz | 1804.8 MHz + 0.9*N + M*5 kHz, N = 0:80, M = −1, 0, or 1 |
| n5 | 15 kHz | 5 MHz | 868.8 MHz + 0.9*N + M*5 kHz, N = 0:25, M = −1, 0, or 1 |
|  | 15 kHz | 10 MHz | 868.8 MHz + 0.9*6*N + M*5 kHz, N = 0:3, M = −1, 0, or 1 |
|  | 30 kHz | 10 MHz | 873.3 MHz + 0.9*6*N + M*5 kHz, N = 0:1, M = −1, 0, or 1 |
| n7 | 15 kHz | 5 MHz | 2620.2 MHz + 0.9*N + M*5 kHz, N = 0:74, M = −1, 0, or 1 |
| n8 | 15 kHz | 5 MHz | 924.6 MHz + 0.9*N + M*5 kHz, N = 0:36, M = −1, 0, or 1 |
| n20 | 15 kHz | 5 MHz | 790.5 MHz + 0.9*N + M*5 kHz, N = 0:31, M = −1, 0, or 1 |
| n28 | 15 kHz | 5 MHz | 758.1 MHz + 0.9*N + M*5 kHz, N = 0:47, M = −1, 0, or 1 |
| n38 | 15 kHz | 5 MHz | 2569.8 MHz + 1.44*N, N = 0:35 |
| n41 | 15 kHz | 5 MHz | 2496 MHz + 1.44*N, N = 0:131 |
|  | 15 kHz | 10 MHz | 2496 MHz + 1.44*3*N, N = 0:43 |
|  | 30 kHz | 10 MHz | 2496 MHz + 1.44*N, N = 0:131 |
| n50 | 15 kHz | 5 MHz | 1432.2 MHz + 0.9*N + M*5 kHz, N = 0:91, M = −1, 0, or 1 |
| n51 | 15 kHz | 5 MHz | 1426.8 MHz + 0.9*N + M*5 kHz, N = 0:2, M = −1, 0, or 1 |
| n66 | 15 kHz | 5 MHz | 2109.9 MHz + 0.9*N + M*5 kHz, N = 0:97, M = −1, 0, or 1 |
|  | 15 kHz | 10 MHz | 2109.9 MHz + 0.9*6*N + M*5 kHz, N = 0:15, M = −1, 0, or 1 |
|  | 30 kHz | 10 MHz | 2195.1 MHz + 0.9*6*N + M*5 kHz, N = 0:14, M = −1, 0, or 1 |
| n70 | 15 kHz | 5 MHz | 1994.7 MHz + 0.9*N + M*5 kHz, N = 0:25, M = −1, 0, or 1 |
| n71 | 15 kHz | 5 MHz | 616.8 MHz + 0.9*N + M*5 kHz, N = 0:36, M = −1, 0, or 1 |
| n74 | 15 kHz | 5 MHz | 1474.5 MHz + 0.9*N + M*5 kHz, N = 0:45, M = −1, 0, or 1 |
| n75 | 15 kHz | 5 MHz | 1432.2 MHz + 0.9*N + M*5 kHz, N = 0:91, M = −1, 0, or 1 |
| n76 | 15 kHz | 5 MHz | 1426.8 MHz + 0.9*N + M*5 kHz, N = 0:2, M = −1, 0, or 1 |
| n77 | 30 kHz | 10 MHz | 3300 MHz + 1.44*N, N = 0:619 |
| n78 | 30 kHz | 10 MHz | 3300 MHz + 1.44*N, N = 0:341 |
| n79 | 30 kHz | 40 MHz | 4400 MHz + 1.44*21*N, N = 0:16 |
| n258 | 120 kHz | 50 MHz | 24250.08 MHz + N*17.28 MHz, N = 0:186 |
| n257 | 120 kHz | 50 MHz | 26513.76 MHz + N *17.28 MHz, N = 0:170 |
|  | 240 kHz | 100 MHz | 26548.32 MHz + 2* N *17.28 MHz, N = 0:83 |
| n260 | 120 kHz | 50 MHz | 37002.72 MHz + N *17.28 MHz, N = 0:171 |
|  | 240 kHz | 100 MHz | 34773.6 MHz + 2* N *17.28 MHz, N = 0:83 |

In particular, a band n77 and a band n78 have 620 synchronization raster candidate values and 342 synchronization raster candidate values, respectively. Hence, it is necessary to have an indication method for indicating an additional state to indicate a next synchronization raster. To this end, it may consider using the remaining state remained after being used in SSB-subcarrier-offset indication. Among 32 states for SSB-subcarrier-offset of FR1, 24 states are used to indicate an offset and 8 states are remained. Hence, it is able to define an indication range of the 'N' using a partial state among the remaining states. And, when there is possibility that RMSI does not exist on a band at which a UE currently accessed, in order to provide the UE with an instruction to make the UE search for a different band, it may consider providing additional indication to the UE to indicate that there is no RMSI on the band.

For example, among the states of the SSB-subcarrier-offset, it may define 4 states described in the following for RMSI indication and SS/PBCH search candidate.

First state: RMSI is not present on a band.
Second state: RMSI is not present in a synchronization raster and a range of 'N' ranges from 0 to 255.
Third state: RMSI is not present in a synchronization raster and a range of 'N' ranges from 256 to 511.
Fourth state: RMSI is not present in a synchronization raster and a range of 'N' ranges from 512 to 767.

5. Initial Active DL BWP

A UE attempts to detect a signal within a bandwidth of an SS/PBCH block while performing an initial synchronization procedure including cell ID detection and PBCH decoding. The UE continuously performs a next initial access procedure including a procedure for obtaining system information and an RACH process within an initial active DL/UL bandwidth.

Figure 17:
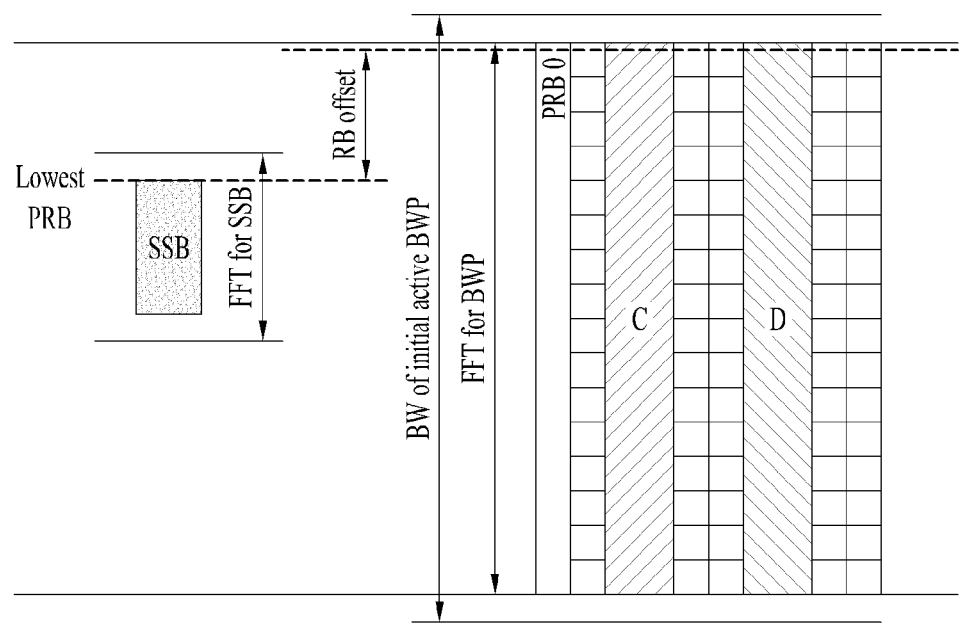

An initial active DL BWP is defined based on a frequency position of an RMSI CORESET, a bandwidth of the RMSI CORESET, and numerology of RMSI. RMSI CORESET configuration and numerology of RMSI can be configured in a PBCH payload. And, an offset between an SS/PBCH block and an initial active DL BWP is indicated via a PBCH. As illustrated in FIG. 17, since the offset is indicated by a random offset between an SS/PBCH block and a channel RB in a frequency range equal to or narrower/wider than 6 GHz, the offset value should be defined not only for a frequency range equal to or narrower than 6 GHz but also for a frequency range equal to or wider than 6 GHz. A UE obtains information on an initial active DL BWP and a CORESET and may be then able to perform a procedure for obtaining system information (i.e., RMSI) based on the information on the initial active BWP and the CORESET.

Figure 18:
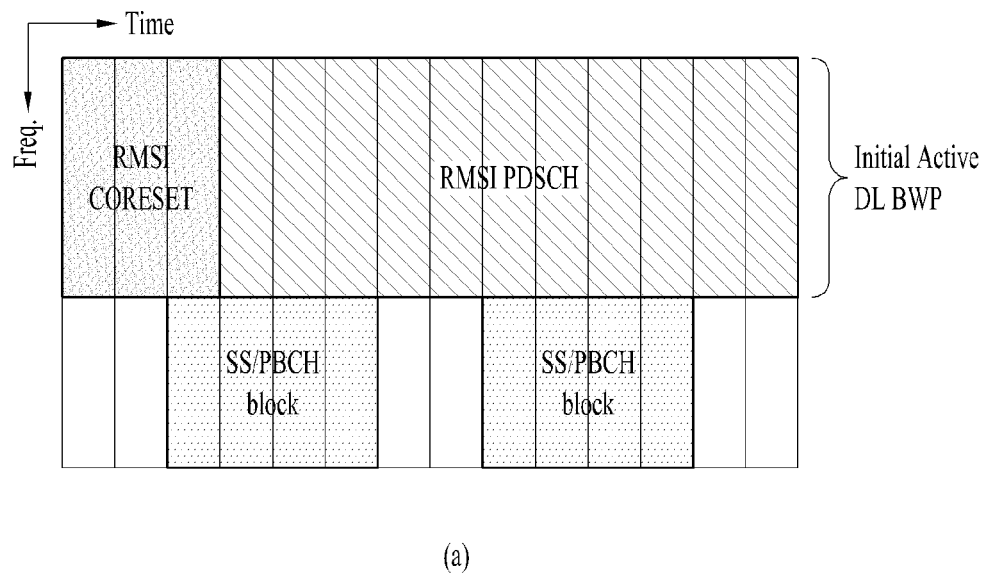
Figure 18:
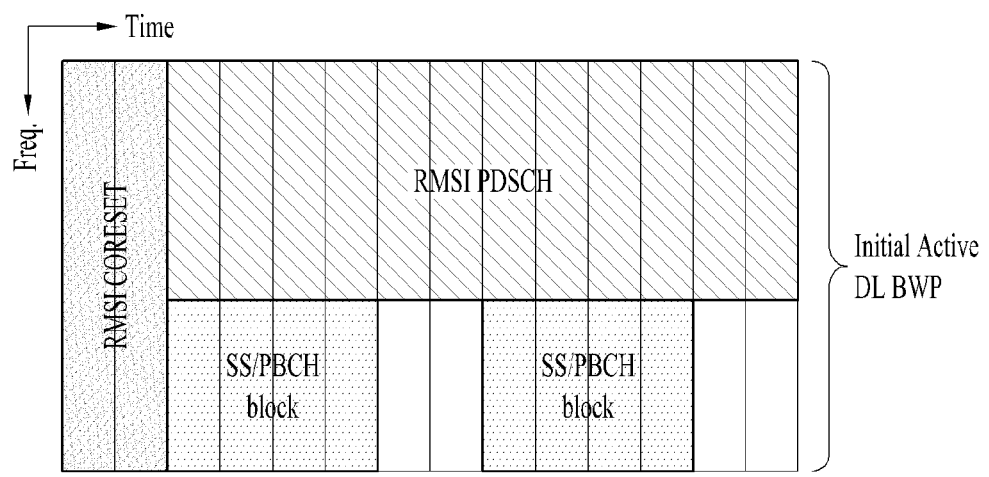

NR supports FDM transmission of a QCLed SS/PBCH block and RMSI. And, it is necessary to clearly indicate a bandwidth on which an SS/PBCH block and an initial active DL BWP are multiplexed. When a resource is allocated to PDSCH on which RMSI corresponding to a PDCCH CORESET is carried, a UE assumes that an SS block is not transmitted in the allocated resource. In particular, as illustrated in FIG. 18, when 3 OFDM symbols are used for RMSI CORESET, an SS/PBCH block and the RMSI CORESET/PDSCH should be FDMed. On the contrary, when the maximum two OFDM symbols are allocated to the RMSI CORESET, the SS/PBCH and the RMSI CORESET are TDMed and the SS/PBCH RMSI PDSCH can be FDMed within the initial active DL BWP.

When a UE performs an initial access procedure, it is necessary for the UE to periodically receive SS/PBCH blocks to perform measurement, time/frequency tracking, RACH power control, and the like. However, if an SS/PBCH block is positioned at the outside of a UE minimum BW, a certain UE incapable of performing a wideband operation should perform frequency retuning to periodically receive an SS/PBCH block. The frequency retuning may increase standby time of the initial access procedure due to RF recombination in the aspect of a UE operation. In particular, in NR, when an SS/PBCH block and an RMSI CORESET are FDMed, the SS/PBCH block and the RMSI CORESET can be FDMed in a manner of being restricted to a UE minimum RX bandwidth.

6. RMSI CORESET Configuration (1) Bit Size for RMSI CORESET Configuration

RMSI configuration of NR-PBCH payload can include a bandwidth for an RMSI CORESET (represented in a PRB unit), OFDM symbols, a frequency position, and a monitoring window. To this end, the PBCH payload uses 56 bits in total including a CRC of 24 bits. In this case, among 32 bits except 24 bits of the CRC, 8 bits can be used for RMSI CORESET configuration. In this case, if 4 bits for indicating a frequency offset correspond to a part for indicating a frequency position, total 12 bits are allocated for the RMSI CORESET configuration. Meanwhile, 3 bits are additionally used for the RMSI CORESET configuration for a frequency band equal to or narrower than 6 GHz.

(2) Required Bandwidth and OFDM Symbol

In order to determine an amount of frequency/time resources (i.e., the number of PRBs and the number of OFDM symbols) necessary for RMSI CORESET configuration, it is necessary to consider aggregation levels supported by NR. For example, when NR supports three aggregation levels including aggregation levels 4, 6, and 8, at least 3 PRB sizes such as 23, 32, and 48 RBs are required. And, the number of PRBs within a channel BW is defined based on subcarrier spacing. For example, when a channel BW corresponds to 10 MHz, the number of PRBs in 15 kHz subcarrier spacing corresponds to 52 and the number of PRBs in 30 kHz subcarrier spacing corresponds to 24. In this case, it may be necessary to have one or two OFDM symbols to provide a required aggregation level. Hence, the present invention proposes two tables (Tables 6 and 7) indicating the number of PRBs and the number of OFDM symbols.

In this case, [Table 6] illustrates the number of PRBs for a single RMSI CORESET and [Table 7] illustrates the number of OFDM symbols for a single RMSI CORESET.

TABLE 6

| Code word | Configured subcarrier spacing for RMSI | | | |
| --- | --- | --- | --- | --- |
| | 15 kHz | 30 kHz | 60 kHz | 120 kHz |
| 00 | 25 (5 MHz) | 24 (10 MHz) | 66 (50 MHz) | 32 (50 MHz) |
| 01 | 52 (10 MHz) | 38 (15 MHz) | 132 (100 MHz) | 66 (100 MHz) |
| 10 | 79 (15 MHz) | 51 (20 MHz) | — | — |
| 11 | 106 (20 MHz) | 106 (40 MHz) | — | — |

TABLE 7

| Code word | Below 6 GHz |
| --- | --- |
| 00 | 1 (when one OFDM symbol is used for PDCCH within a slot) |
| 01 | 1 (when two OFDM symbols are used for PDCCH within a slot) |
| 10 | 2 |
| 11 | 3 |

In Table 6, the number of PRBs is defined based on subcarrier spacing indicated by a PBCH payload. And, since the number of RMSI CORESET bandwidths varies depending on a frequency range, it may consider a different bit size when a bandwidth is configured. For example, 2 bits are used for a frequency band equal to or narrower than 6 GHz and 1 bit can be used for a frequency band equal to or wider than 6 GHz. Based on this, it may be able to determine a UE minimum BW for a bandwidth of an RMSI CORESET. For example, a UE minimum BW may correspond to 20/40 MHz on a frequency band equal to or narrower than 6 GHz and a UE minimum BW may correspond to up to 100 MHz on a frequency band equal to or wider than 6 GHz. However, a part of configurations of Table 6 can be excluded from the frequency band equal to or wider than 6 GHz. For example, 100 MHz bandwidth can be excluded from the frequency band equal to or wider than 6 GHz.

In Table 7, the number of OFDM symbols is defined. An RMSI CORESET may use the maximum 3 OFDM symbols for PDCCH within a slot. In particular, the maximum 2 RMSI CORESETs can be configured within a slot. If one OFDM symbol is allocated for an RMSI CORESET, the maximum two OFDM symbols can be used for PDCCH within a slot. Otherwise, one RMSI CORESET can be used within a slot.

(3) Frequency Position Indication

Figure 19:
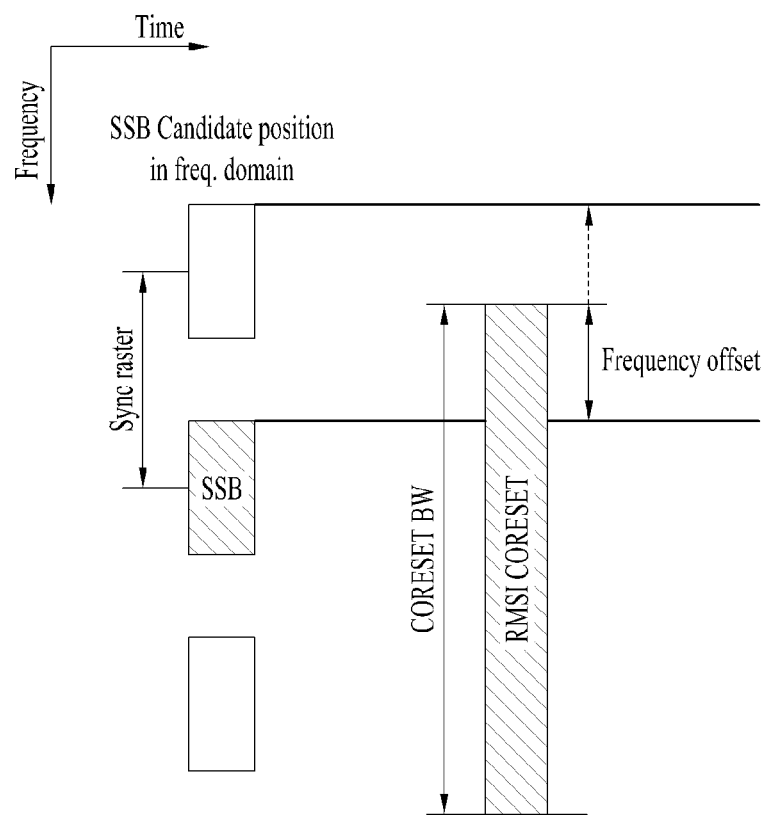

A frequency position of an RMSI CORESET can be indicated by a relative RE offset between the frequency position of the RMSI CORESET and a frequency position of an SS/PBCH block. The RF offset is defined by subcarrier spacing of the SS/PBCH block. FIG. 19 illustrates an embodiment of indicating a frequency position of an RMSI CORESET.

Referring to FIG. 19, when the lowest PRB of an RSMI CORESET exists between candidate positions of two consecutive SS/PBCH blocks for SS/PBCH block transmission, a network can select a candidate SS/PBCH block position having a higher frequency position from among the candidate positions of the two consecutive SS/PBCH blocks. A cell in which an SSB is defined (i.e., an SS/PBCH block having RMSI) is transmitted at the candidate SS/PBCH block position having a higher frequency position and an RMSI CORESET is indicated on the basis of the lowest PBR index of SS/PBCH block. If it is assumed that the RMSI CORESET is indicated on the basis of the SS/PBCH block having a higher frequency position among the candidate positions of the two consecutive SS/PBCH blocks for SS/PBCH block transmission, the maximum range of a frequency positon offset between the RMSI CORESET and the SS/PBCH block is defined by a synchronization raster.

When the RMSI CORESET is indicated on the basis of the SS/PBCH block having a higher frequency position among the candidate positions of the two consecutive SS/PBCH blocks, it means that the SS/PBCH block corresponds to an SS/PBCH block closest to the center of the RMSI CORESET. Specifically, referring to FIG. 19, since an offset value is defined by an offset value between the lowest PRB of the RMSI CORESET and the lowest PRB of the SS/PBCH block, a PRB of an upper part becomes a PRB having a lower index in FIG. 19. In particular, the lowest PRB of the RMSI CORESET corresponds to a PRB positioned at the top of the RMSI CORESET. Hence, SS/PBCH blocks positioned at below and above of the lowest PRB of the RMSI CORESET correspond to an SS/PBCH block positioned at the top and an SS/PBCH block positioned at the middle among SS/PBCH blocks illustrated in FIG. 19.

In particular, in FIG. 19, a frequency value of an upper part is low and a frequency value of a lower part is high. Hence, a candidate SS/PBCH block capable of being a reference of an offset value corresponds to the SS/PBCH block positioned at the top and the SS/PBCH block positioned at the middle. In this case, a relative RB value difference between the lowest PRB (positioned at the top in FIG. 19) of the middle SS/PBCH block having a higher frequency position and the lowest PRB of the RMSI CORESET is defined as an offset.

In particular, referring to FIG. 19, since the SS/PBCH block positioned at the middle is closest to the center of the RMSI CORESET among the SS/PBCH block positioned at the top and the SS/PBCH block positioned at the middle, when an SS/PBCH block having a higher frequency position is determined as a reference SS/PBCH block of an offset value, it means that the SS/PBCH block corresponds to an SS/PBCH block closest to the center of the RMSI CORESET.

And, a synchronization raster is defined by the minimum channel bandwidth, an SS/PBCH block bandwidth, and a channel raster. For example, when the minimum channel bandwidth is getting wider, the synchronization raster is widened. Hence, a wider synchronization raster has a merit in that the number of SS entries is reduced. However, when a synchronization raster is wide, a bit size for indicating a frequency position between an RMSI CORESET and an SS/PBCH block increases. Hence, it is necessary to determine an appropriate range of the synchronization raster in consideration of the aforementioned items.

[Table 8] to [Table 13] described in the following show an example of a bit size necessary for indicating a frequency offset according to the minimum channel bandwidth and subcarrier spacing.

TABLE 8

SCS of SS/PBCH block: 15 kHz, Channel raster: 10 kHz

| # of RB within min CH BW (RB) | Sync raster (kHz) | # of SS entry within 40 MHz BW | # of REs between sync raster (REs) | Indication bit |
|---|---|---|---|---|
| 25 | 900 | 45 | 74 | 7 |
| 52 | 5700 | 8 | 394 | 9 |

TABLE 9

SCS of SS/PBCH block: 15 kHz, Channel raster: 15 kHz

| # of RB within min CH BW (RB) | Sync raster (kHz) | # of SS entry −100 MHz BW | # of REs between sync raster (REs) | Indication bit |
|---|---|---|---|---|
| 25 | 915 | 110 | 61 | 6 |
| 52 | 5775 | 18 | 385 | 9 |

TABLE 10

SCS of SS/PBCH block: 30 kHz, Channel raster: 100 kHz

| # of RB within min CH BW (RB) | Sync raster (kHz) | # of SS entry within 40 MHz BW | # of REs between sync raster (REs) | Indication bit |
|---|---|---|---|---|
| 24 | 1500 | 27 | 50 | 6 |

TABLE 11

SCS of SS/PBCH block: 30 kHz, Channel raster: 15 kHz

| # of RB within min CH BW (RB) | Sync raster (kHz) | # of SS entry-100 MHz BW | # of REs between sync raster (REs) | Indication bit |
|---|---|---|---|---|
| 24 | 1455 | 69 | 49 | 6 |
| 38 | 6495 | 16 | 217 | 8 |
| 51 | 11175 | 9 | 373 | 9 |
| 106 | 30975 | 4 | 1033 | 11 |

TABLE 12

SCS of SS/PBCH block: 120 kHz, Channel raster: 60 kHz

| # of RB within min CH BW (RB) | Sync raster (kHz) | # of SS entry-500 MHz BW | # of REs between sync raster (REs) | Indication bit |
|---|---|---|---|---|
| 32 | 17340 | 29 | 145 | 8 |
| 66 | 66300 | 8 | 553 | 10 |

TABLE 13

| SCS of SS/PBCH block: 240 kHz, Channel raster: 60 kHz | | | | |
|---|---|---|---|---|
| # of RB within min CH BW (RB) | Sync raster (kHz) | # of SS entry-500 MHz BW | # of REs between sync raster (REs) | Indication bit |
| 33 | 37500 | 14 | 157 | 8 |

According to [Table 9], when the minimum channel bandwidth corresponds to 10 MHz, 52 PRBs are assumed for subcarrier spacing of 15 kHz. Hence, a synchronization raster may correspond to 5775 kHz and the synchronization raster is represented as 385 REs in the subcarrier spacing of 15 kHz. In this case, maximum 9 bits are required to indicate an RE level frequency offset.

According to [Table 11], when the minimum channel bandwidth corresponds to 40 MHz, 106 PRBs are assumed for subcarrier spacing of 30 kHz. Hence, a synchronization raster may correspond to 30975 kHz and the synchronization raster is represented as 1033 REs in the subcarrier spacing of 30 kHz. In this case, maximum 11 bits are required to indicate an RE level frequency offset. And, according to [Table 12], when the minimum channel bandwidth corresponds to 50 MHz, a synchronization raster may correspond to 17340 kHz for subcarrier spacing of 120 kHz and the synchronization raster is represented as 145 REs in the subcarrier spacing of 120 kHz. In this case, maximum 8 bits are required to indicate an RE level frequency offset.

However, if a required bit size is too big to be allowed in PBCH MIB, NR may reduce a size of a synchronization raster or set a limit on a frequency offset indication range. For example, in case of subcarrier spacing of 30 kHz, since the maximum 11 bits are required to indicate a frequency offset, it may consider reducing a size of a synchronization raster.

Referring back to [Table 11], when 51 PRBs are assumed for subcarrier spacing of 30 kHz, a synchronization raster may correspond to 11175 kHz and the synchronization raster is represented as 373 REs in the subcarrier spacing of 30 kHz. Then, the maximum 9 bits are required to indicate an RE level frequency offset. Meanwhile, according to the method above, although the number of SS entries increases to 9 form 4, it is not an important issue. In case of subcarrier spacing of 120 kHz, it may set a limit on a range of frequency offset indication. If the maximum frequency range of frequency position indication between an RMSI CORESET and an SS/PBCH block is restricted to 128 REs, maximum 7 bits are required to indicate the RE level frequency offset.

In the following, operations of a UE and a base station necessary for indicating the RMSI CORESET frequency position are described according to embodiments of the present invention.

Figure 20:
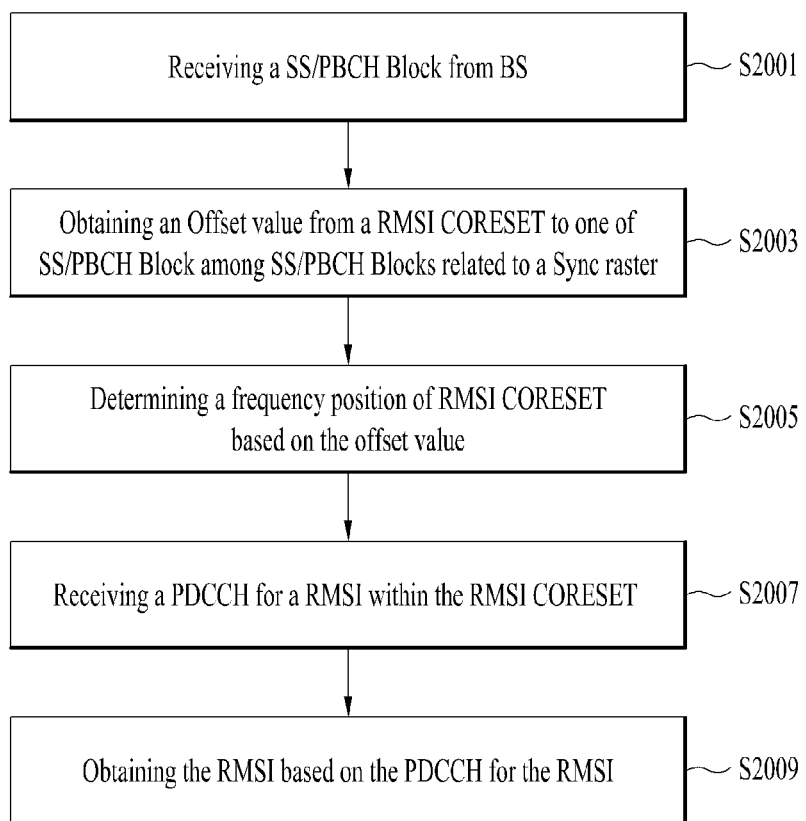

FIG. 20 illustrates an operation of a UE. Referring to FIG. 20, the UE receives an SS/PBCH block from a base station [S2001] and obtains an offset value indicating a position of an RMSI CORESET via PBCH contents (i.e., MIB) included in the SS/PBCH block. In this case, as mentioned in the foregoing description, the offset value corresponds to an offset value between the lowest PRB index of the RMSI CORESET and a PRB of an SS/PBCH having the highest frequency position among a plurality of SS/PBCH blocks positioned at the below and above of the lowest PRB index [S2003].

Meanwhile, as mentioned in the foregoing description, the PRB offset value between the RMSI CORESET and the SS/PBCH block can be restricted based on subcarrier spacing, a synchronization raster, and the minimum channel bandwidth. In other word, in order to prevent too many bits from being used for indicating a PRB offset value, it may set a limit on a range of a synchronization raster according to subcarrier spacing and configure an offset value based on the adjusted range. Hence, the number of bits necessary for indicating the offset value may vary.

The UE determines a frequency position of the RMSI CORESET based on the offset value [S2005], receives PDCCH for scheduling RMSI within the RMSI CORESET, which is determined based on information on a size of the RMSI CORESET obtained via the PBCH contents (i.e., MIB) [S2007], and obtains RMSI based on scheduling information of the PDCCH [S2009]. In this case, the size of the RMSI CORESET can be obtained together via a bit for indicating the offset value.

Figure 21:
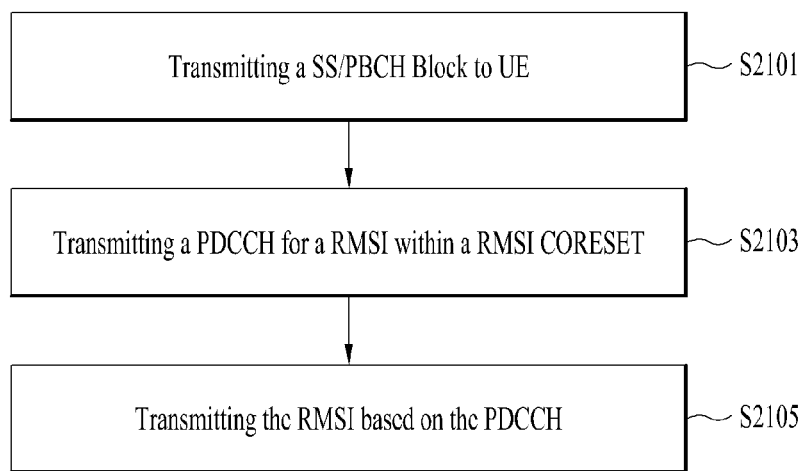

Operations of a base station are described in the following. Referring to FIG. 21, the base station transmits an SS/PBCH block to a UE. In this case, the base station can transmit the SS/PBCH block to the UE by including information on an offset value corresponding to a relative frequency position between the lowest PRB of an RMSI CORESET and an SS/PBCH block having a high frequency position among a plurality of SS/PBCH blocks existing in a synchronization raster at which the RMSI CORESET is positioned in PBCH contents (i.e., MIB) [S2101]. And, it is also able to know a size of the RMSI CORESET via values of bits for the offset value.

Subsequently, the base station transmits PDCCH for scheduling RMSI within the RMSI CORESET based on information on the RMSI CORESET included in the PBCH contents [S2103] and transmits the RMSI to the UE according to the scheduling of the PDCCH [S2105].

Figure 22:
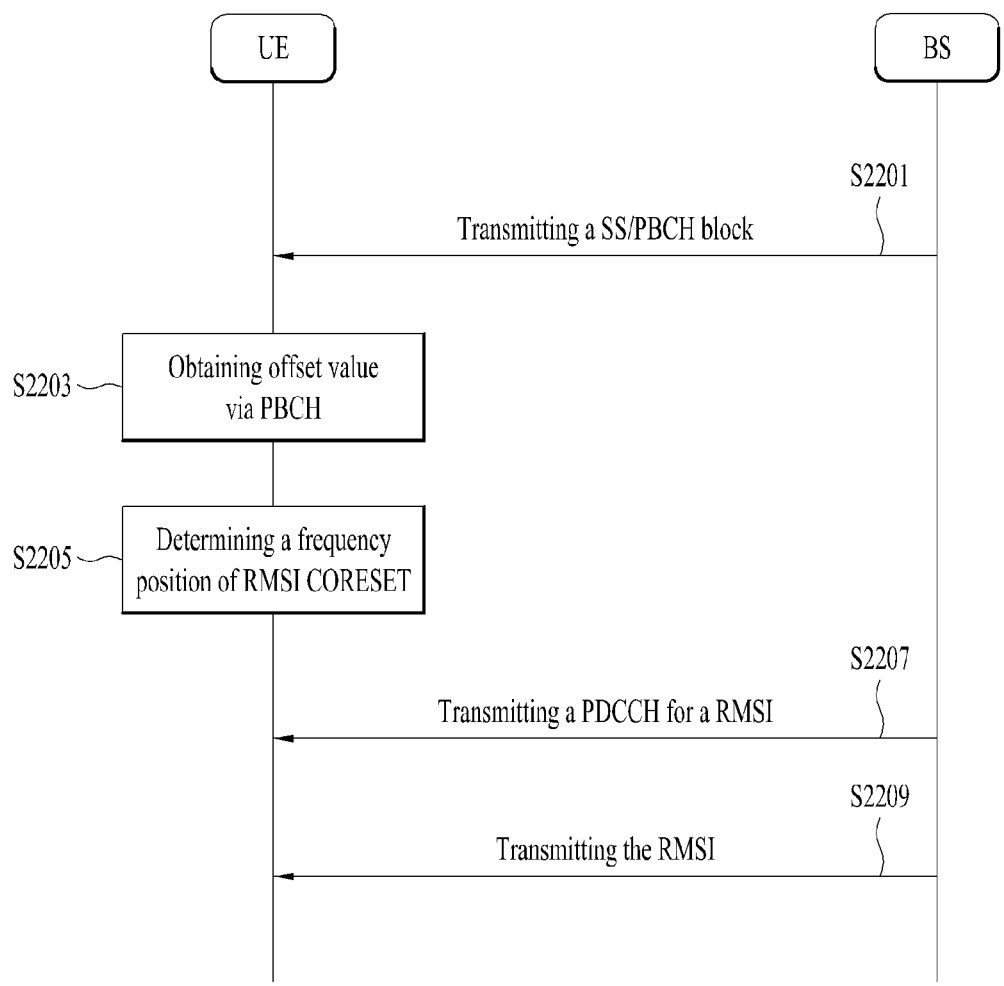

The operations of the base station and the UE are briefly summarized in the following with reference to FIG. 22. The base station transmits an SS/PBCH block to the UE [S2201] and the UE performs decoding on PBCH to obtain information on a position and a size of an RMSI CORESET [S2203]. In this case, the position of the RMSI CORESET can be obtained via an offset value indicating a relative position between the lowest PRB of the RMSI CORESET and an SS/PBCH block having a high frequency position among a plurality of SS/PBCH blocks related to a synchronization raster corresponding to a frequency in which the RMSI CORESET exists.

The UE determines a frequency position and a size of the RMSI CORESET based on the obtained information [S2205] and receives PDCCH for scheduling RMSI from the base station via the RMSI CORESET [S2207]. Subsequently, the UE receives RMSI based on scheduling information obtained via the PDCCH [S2209].

(4) RMSI PDCCH Monitoring Window Configuration

Figure 23:
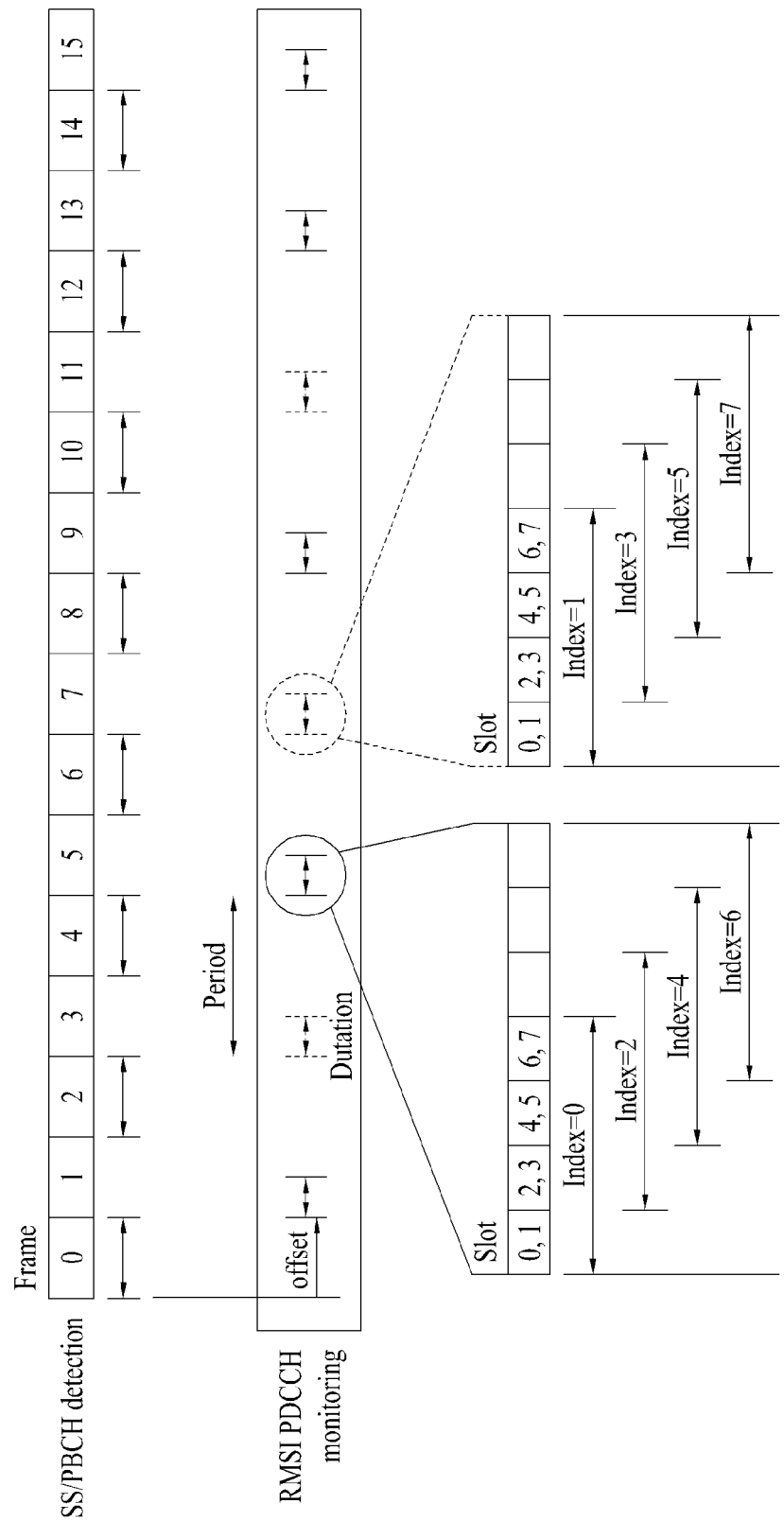

An RMSI PDCCH monitoring window related to an SS/PBCH block is periodically repeated. FIG. 23 illustrates an embodiment for an offset, duration, and a period of the RMSI PDCCH monitoring window.

An RMSI PDCCH monitoring period can be defined to be equal to or longer than a default period for detecting an SS/PBCH block. In an initial access procedure, a UE detects an SS/PBCH block every 20 ms. In particular, a default detection period of an SS/PBCH corresponds to 20 ms.

If it is assumed that an RMSI CORESET transmits an SS/PBCH block corresponding to the RMSI CORESET, a UE can monitor the RMSI CORESET with a period (i.e., 20 ms) identical to the detection period of the SS/PBCH block.

When an RMSI TTI is determined by 160 ms, since the default detection period of the SS/PBCH block corresponds to 20 ms, it may be able to repeatedly receive the same RMSI 8 times.

Meanwhile, if a period of RMSI transmission is shortened, the coverage of RMSI can be expanded. However, in this case, a network will reserve DL-dedicated transmission duration for delivering broadcast system information and the DL-dedicated transmission duration may set a limit on flexibility of resource utilization. For example, according to TS 38.213 v 1.3.0, when the number of SS/PBCH blocks corresponds to 8, RMSI subcarrier spacing corresponds to 15 kHz, O corresponds to 5, the number of search space sets per slot corresponds to 1, and M corresponds to 2, UL configuration may not be feasible in 10 ms. Moreover, time resources for UL configuration can be reduced in a frequency range equal to or wider than 6 GHz.

Although it may set a limit on the number of SS/PBCH blocks to solve the problem above, it may bring about too many restrictions in NR system. Meanwhile, it may consider a method of modifying a parameter in Tables 13-9 to 13-13 of TS 38.213. In other word, when M corresponds to 2, many problems occur. Hence, a value of the M can be configured by ½ or 1. And, a set of O values corresponds to {0, 2, 5, 7} in a frequency range narrower than 6 GHz and corresponds to {0, 2.5, 5, 7.5} in a frequency range equal to or wider than 6 GHz. However, when an offset value greater than 5 ms is configured, a time resource of 10 ms is not sufficient for the UL configuration. Hence, a configuration of the O value is modified into {0, 2, 10, 12} in the frequency range narrower than 6 GHz and is modified into {0, 2.5, 10, 12.5} in the frequency range equal to or wider than 6 GHz.

On the other hand, when a UE monitors PDCCH based on a shorter period, battery consumption of the UE may increase. Hence, it is necessary to consider a longer period such as 40 ms.

However, in order to transmit multiple RMSIs having a plurality of beam directions, it may also consider a shorter period such as 20 ms to provide a plurality of transmission occasions. In this case, as illustrated in FIG. 23, when a gNB alternately transmits an RMSI CORESET for an even-numbered index beam and an RMSI CORESET for an odd-numbered index beam every 20 ms, a UE can monitor an RMSI CORESET corresponding to a specific SS/PBCH block index with a period of 40 ms for a specific SS.

Duration of RMSI PDCCH monitoring can be determined based on the number of actually transmitted SS/PBCH blocks. For example, when multiple SS/PBCH blocks are transmitted, it may be necessary to have longer monitoring duration to transmit multiple RMSIs having a different direction. In this case, a UE may assume that RMSI monitoring duration is longer. However, when the number of the actually transmitted SS/PBCH blocks is less, if the UE fixedly assumes that the RMSI monitoring duration is longer, it is not efficient in terms of battery consumption.

Hence, it is necessary for the gNB to configure the RMSI PDCCH monitoring duration. For example, the RMSI PDCCH monitoring duration can be configured by duration of 2 slots or duration of 4 slots. In this case, an RMSI PDCCH monitoring window can be overlapped between SS/PBCH blocks. In this case, the UE can detect PDCCH capable of being QCLed between SS/PBCH blocks different from each other. And, in order to avoid ambiguity between an SS/PBCH block index and RMSI, a scrambling sequence of PDCCH for the RMSI or DMRS sequences can be reset by the SS/PBCH block index.

An offset capable of being configured for RMSI PDCCH monitoring can provide resource utilization flexibility to a network. For example, when the network has a wide spectrum, a gNB can transmit an SS/PBCH block and RMSI within the same duration. When the network has flexibility capable of individually transmitting SS/PBCH blocks and RMSI, the gNB can transmit the RMSI based on a time interval different from a time interval at which an SS/PBCH block is transmitted. Meanwhile, when a semi-static DL/UL allocation period is considered, 0 ms and 10 ms are appropriate for an offset value.

(5) Multiplexing Pattern 2, when Subcarrier Spacing of SS/PBCH Block Corresponds to 240 kHz and Subcarrier Spacing of PDCCH Corresponds to 60 kHz Multiplexing between an SS/PBCH block and an RMSI CORESET/PDSCH is feasible. A pattern 1 for the multiplexing is defined to support TDM between an SS/PBCH block and RMSI on a frequency equal to or narrower than 6 GHz. Patterns 2 and 3 are defined to support FDM between an SS/PBCH block and RMSI on a frequency equal to or wider than 6 GHz.

However, the pattern 2 has not been defined yet for {SS/PBCH block, PDCCH} subcarrier spacing {240, 60}. Since an SS/PBCH block of 240 kHz has a merit in that the SS/PBCH block reduces overhead due to beam sweeping, it is necessary to define the pattern 2 for the {SS/PBCH block, PDCCH} subcarrier spacing {240, 60}.

Meanwhile, it is necessary for an RMSI CORESET to have sufficient OFDM symbols to support the pattern 2. As a method of using the pattern 2 for subcarrier spacing {240, 60} kHz, an RMSI CORESET alternately transmits an even-numbered index beam and an odd-numbered index beam every 20 ms. FIG. 24 illustrates an embodiment of the pattern 2 for {SS/PBCH block, PDCCH} subcarrier spacing {240, 60} kHz.

In particular, a UE can efficiently monitor an RMSI CORESET according to an SS/PBCH block index having periodicity of 40 ms for a case of {SS/PBCH block, PDCCH} subcarrier spacing {240, 60} kHz in accordance with the pattern 2 illustrated in FIG. 24.

The pattern 2 illustrated in FIG. 24 can be summarized as indexes 4, 5, 6, and 7 of [Table 14] described in the following.

TABLE 14

| Index | SS/PBCH block and control resource set multiplexing pattern | Number of RBs $N_{RB}^{CORESET}$ | Number of Symbols $N_{symb}^{CORESET}$ | Offset (RBs) |
| --- | --- | --- | --- | --- |
| 0 | 1 | 96 | 1 | 0 |
| 1 | 1 | 96 | 1 | 16 |
| 2 | 1 | 96 | 2 | 0 |
| 3 | 1 | 96 | 2 | 16 |
| 4 | 2 | 48 | 1 | −81 if condition A<br>−82 if condition B |
| 5 | 2 | 48 | 1 | 49 |
| 6 | 2 | 96 | 1 | −81 if condition A<br>−82 if condition B |
| 7 | 2 | 96 | 1 | 97 |
| 8 | Reserved | | | |
| 9 | Reserved | | | |
| 10 | Reserved | | | |
| 11 | Reserved | | | |
| 12 | Reserved | | | |

TABLE 14-continued

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 13 | Reserved | | | |
| 14 | Reserved | | | |
| 15 | Reserved | | | |

(6) Wide Bandwidth Support

According to a current CORESET configuration, a UE minimum bandwidth should be equal to or narrower than 20 MHz on FR1 and the UE minimum bandwidth should be equal to or narrower than 50 MHz on FR2. However, an assumption for RMSI CORESET design should be changed. This is because it is necessary for all bandwidths listed on TS 38.101-1 v15.0.0 Table 5.3.5-1 to have a single component carrier for all NR bands equal to or narrower than 6 GHz. In particular, 15 kHz subcarrier spacing should support 50 MHz BW and 30 kHz subcarrier spacing should support 100 MHz BW. In particular, in case of subcarrier spacing of 15/30 kHz, if such a bandwidth wider than a legacy agreed bandwidth as 50 MHz BW/100 MHz BW is introduced to an RMSI CORESET, it may apply the less number of OFDM symbols for the RMSI CORESET.

In order to support a wider bandwidth, it may consider configuring one or more RBs (e.g., 196 RBs) for a CORESET configuration. In particular, it may use 5 bits for an RMSI CORESET configuration. The RMSI CORESET configuration using 5 bits can be represented as [Table 15] to [Table 18] described in the following.

TABLE 15

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | 1 | 192 | 1 | 86 |
| 16 | 1 | 192 | 2 | 86 |
| 17 | 1 | 192 | 3 | 86 |
| 18 | Reserved | | | |
| 19 | Reserved | | | |
| 20 | Reserved | | | |
| 21 | Reserved | | | |
| 22 | Reserved | | | |
| 23 | Reserved | | | |
| 24 | Reserved | | | |
| 25 | Reserved | | | |
| 26 | Reserved | | | |
| 27 | Reserved | | | |
| 28 | Reserved | | | |
| 29 | Reserved | | | |
| 30 | Reserved | | | |
| 31 | Reserved | | | |

TABLE 16

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 6 |
| 1 | 1 | 24 | 2 | 7 |
| 2 | 1 | 24 | 2 | 8 |
| 3 | 1 | 24 | 3 | 6 |
| 4 | 1 | 24 | 3 | 7 |
| 5 | 1 | 24 | 3 | 8 |
| 6 | 1 | 48 | 1 | 18 |
| 7 | 1 | 48 | 1 | 20 |
| 8 | 1 | 48 | 2 | 18 |
| 9 | 1 | 48 | 2 | 20 |
| 10 | 1 | 48 | 3 | 18 |
| 11 | 1 | 48 | 3 | 20 |
| 12 | 1 | 96 | 1 | 43 |
| 13 | 1 | 96 | 2 | 43 |
| 14 | 1 | 96 | 3 | 43 |
| 15 | Reserved | | | |

TABLE 17

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9 | 1 | 192 | 1 | 76 |
| 10 | 1 | 192 | 2 | 76 |
| 11 | 1 | 192 | 3 | 76 |
| 12 | Reserved | | | |
| 13 | Reserved | | | |
| 14 | Reserved | | | |
| 15 | Reserved | | | |

TABLE 18

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |
| 16 | 1 | 96 | 1 | 38 |
| 17 | 1 | 96 | 2 | 38 |
| 18 | 1 | 96 | 3 | 38 |
| 19 | 1 | 192 | 1 | 86 |
| 20 | 1 | 192 | 2 | 86 |

TABLE 18-continued

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 21 | 1 | 192 | 3 | 86 |
| 22 | | Reserved | | |
| 23 | | Reserved | | |
| 24 | | Reserved | | |
| 25 | | Reserved | | |
| 26 | | Reserved | | |
| 27 | | Reserved | | |
| 28 | | Reserved | | |
| 29 | | Reserved | | |
| 30 | | Reserved | | |
| 31 | | Reserved | | |

(7) Synchronization Raster According to RAN 4 Agreement

An accurate value of a synchronization raster has been determined after an RMSI CORESET configuration table is created under the assumption that the synchronization raster corresponds to 900 kHz when subcarrier spacing corresponds to 15 kHz and the synchronization raster corresponds to 1.44 MHz when subcarrier spacing corresponds to 30 kHz. [Table 19] illustrates a value of the synchronization raster according to a frequency range.

TABLE 19

| Frequency Range | SCS of SS/PBCH block | min CH BW | sync Raster |
|---|---|---|---|
| 0~2.65 GHz | 15 kHz | 5 MHz | 900 kHz |
| | | 10 MHz | 5400 kHz |
| | 30 kHz | 10 MHz | 900 kHz |
| 2.4~24.5 GHz | 15 kHz | 10 MHz | 4320 kHz |
| | 30 kHz | 10 MHz | 1440 kHz |
| | | 40 MHz | 30240 kHz |
| 24.25~100 GHz | 120 kHz | 50 MHz | 17280 kHz |
| | | 100 MHz | 17280 kHz |
| | 240 kHz | 100 MHz | 34560 kHz |

As illustrated in [Table 19], a synchronization raster is defined based on a frequency range, subcarrier spacing of an SS/PBCH block, and the minimum channel BW. Referring to [Table 17], when the minimum channel BW is wide, a synchronization raster is widened.

When a multiplexing pattern 1 using TDM transmission is used on a frequency band equal to or narrower than 6 GHz only, it is able to define a new configuration table for an offset between a frequency positon of an RMSI CORESET and a frequency position of an SS/PBCH block. The new configuration table for the offset is defined by a synchronization raster. The new configuration table is shown in [Table 20] in the following.

TABLE 20

| Frequency Range | SCS of SS/PBCH block | min CH BW | Sync Raster | Configuration |
|---|---|---|---|---|
| 0~2.65 GHz | 15 kHz | 10 MHz | 5400 kHz (30 RBs) | Depicted in Table 21 and Table 22 |
| 2.4~24.5 GHz | 15 kHz | 10 MHz | 4320 kHz (24 RBs) | Depicted in Table 21 and Table 22 |
| | 30 kHz | 40 MHz | 30240 kHz (84 RBs) | Depicted in Table 23 and Table 24 |

TABLE 21

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 2 | 0 |
| 1 | 1 | 48 | 2 | 5 |
| 2 | 1 | 48 | 2 | 10 |
| 3 | 1 | 48 | 2 | 15 |
| 4 | 1 | 48 | 2 | 20 |
| 5 | 1 | 48 | 2 | 25 |
| 6 | 1 | 48 | 2 | 30 |
| 7 | 1 | 48 | 3 | 0 |
| 8 | 1 | 48 | 3 | 5 |
| 9 | 1 | 48 | 3 | 10 |
| 10 | 1 | 48 | 3 | 15 |
| 11 | 1 | 48 | 3 | 20 |
| 12 | 1 | 48 | 3 | 25 |
| 13 | 1 | 48 | 3 | 30 |
| 14 | 1 | 96 | 1 | 0 |
| 15 | 1 | 96 | 1 | 11 |
| 16 | 1 | 96 | 1 | 22 |
| 17 | 1 | 96 | 1 | 33 |
| 18 | 1 | 96 | 1 | 44 |
| 19 | 1 | 96 | 2 | 0 |
| 20 | 1 | 96 | 2 | 11 |
| 21 | 1 | 96 | 2 | 22 |
| 22 | 1 | 96 | 2 | 33 |
| 23 | 1 | 96 | 2 | 44 |
| 24 | 1 | 192 | 1 | 0 |
| 25 | 1 | 192 | 1 | 25 |
| 26 | 1 | 192 | 2 | 0 |
| 27 | 1 | 192 | 2 | 25 |
| 28 | | Reserved | | |
| 29 | | Reserved | | |
| 30 | | Reserved | | |
| 31 | | Reserved | | |

TABLE 22

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 2 | 5 |
| 6 | 1 | 24 | 2 | 6 |
| 7 | 1 | 24 | 2 | 7 |
| 8 | 1 | 24 | 2 | 8 |
| 9 | 1 | 24 | 2 | 9 |
| 10 | 1 | 24 | 2 | 10 |
| 11 | 1 | 24 | 2 | 11 |
| 12 | 1 | 24 | 2 | 12 |
| 13 | 1 | 24 | 2 | 13 |
| 14 | 1 | 24 | 2 | 14 |
| 15 | 1 | 48 | 1 | 0 |
| 16 | 1 | 48 | 1 | 4 |
| 17 | 1 | 48 | 1 | 8 |
| 18 | 1 | 48 | 1 | 12 |
| 19 | 1 | 48 | 2 | 0 |
| 20 | 1 | 48 | 2 | 4 |
| 21 | 1 | 48 | 2 | 8 |
| 22 | 1 | 48 | 2 | 12 |
| 23 | 1 | 48 | 3 | 0 |
| 24 | 1 | 48 | 3 | 4 |
| 25 | 1 | 48 | 3 | 8 |
| 26 | 1 | 48 | 3 | 12 |
| 27 | 1 | 96 | 1 | 0 |
| 28 | 1 | 96 | 1 | 10 |
| 29 | 1 | 96 | 2 | 0 |

TABLE 22-continued

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 30 | 1 | 96 | 2 | 10 |
| 31 | | Reserved | | |

TABLE 23

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 1 | 1 | 192 | 1 | 25 |
| 2 | 1 | 192 | 1 | 50 |
| 3 | 1 | 192 | 1 | 75 |
| 4 | 1 | 192 | 1 | 100 |
| 5 | 1 | 192 | 1 | 125 |
| 6 | 1 | 192 | 1 | 150 |
| 7 | 1 | 192 | 2 | 0 |
| 8 | 1 | 192 | 2 | 25 |
| 9 | 1 | 192 | 2 | 50 |
| 10 | 1 | 192 | 2 | 75 |
| 11 | 1 | 192 | 2 | 100 |
| 12 | 1 | 192 | 2 | 125 |
| 13 | 1 | 192 | 2 | 150 |
| 14 | 1 | 192 | 3 | 0 |
| 15 | 1 | 192 | 3 | 25 |
| 16 | 1 | 192 | 3 | 50 |
| 17 | 1 | 192 | 3 | 75 |
| 18 | 1 | 192 | 3 | 100 |
| 19 | 1 | 192 | 3 | 125 |
| 20 | 1 | 192 | 3 | 150 |
| 21 | | Reserved | | |
| 22 | | Reserved | | |
| 23 | | Reserved | | |
| 24 | | Reserved | | |
| 25 | | Reserved | | |
| 26 | | Reserved | | |
| 27 | | Reserved | | |
| 28 | | Reserved | | |
| 29 | | Reserved | | |
| 30 | | Reserved | | |
| 31 | | Reserved | | |

TABLE 24

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 1 | 1 | 96 | 1 | 11 |
| 2 | 1 | 96 | 1 | 22 |
| 3 | 1 | 96 | 1 | 33 |
| 4 | 1 | 96 | 1 | 44 |
| 5 | 1 | 96 | 1 | 55 |
| 6 | 1 | 96 | 1 | 66 |
| 7 | 1 | 96 | 1 | 77 |
| 8 | 1 | 96 | 1 | 88 |
| 9 | 1 | 96 | 2 | 0 |
| 10 | 1 | 96 | 2 | 11 |
| 11 | 1 | 96 | 2 | 22 |
| 12 | 1 | 96 | 2 | 33 |
| 13 | 1 | 96 | 2 | 44 |
| 14 | 1 | 96 | 2 | 55 |
| 15 | 1 | 96 | 2 | 66 |
| 16 | 1 | 96 | 2 | 77 |
| 17 | 1 | 96 | 2 | 88 |
| 18 | 1 | 192 | 1 | 0 |
| 19 | 1 | 192 | 1 | 25 |
| 20 | 1 | 192 | 1 | 50 |
| 21 | 1 | 192 | 1 | 75 |
| 22 | 1 | 192 | 2 | 0 |
| 23 | 1 | 192 | 2 | 25 |
| 24 | 1 | 192 | 2 | 50 |
| 25 | 1 | 192 | 2 | 75 |
| 26 | | Reserved | | |
| 27 | | Reserved | | |
| 28 | | Reserved | | |
| 29 | | Reserved | | |
| 30 | | Reserved | | |
| 31 | | Reserved | | |

(8) Configuration of PMSI PDCCH Monitoring Window Occasion for Multiplexing Pattern 1

When PDSCH on which SystemInformationBlockType1 (i.e., RMSI) is forwarded is received, a UE may assume that an SS/PBCH block is not transmitted in an RE in which the PDSCH is received.

Figure 25:
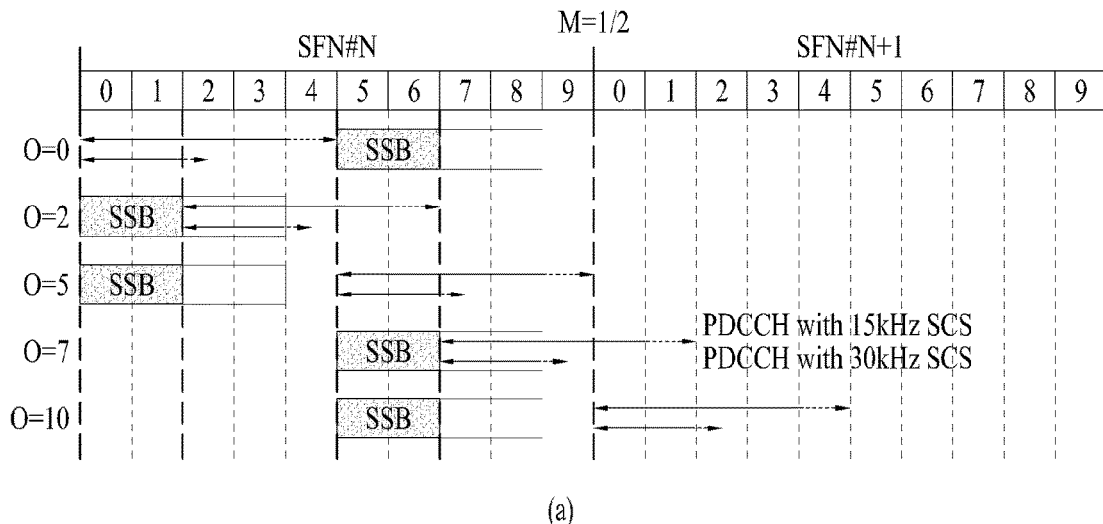
Figure 25:
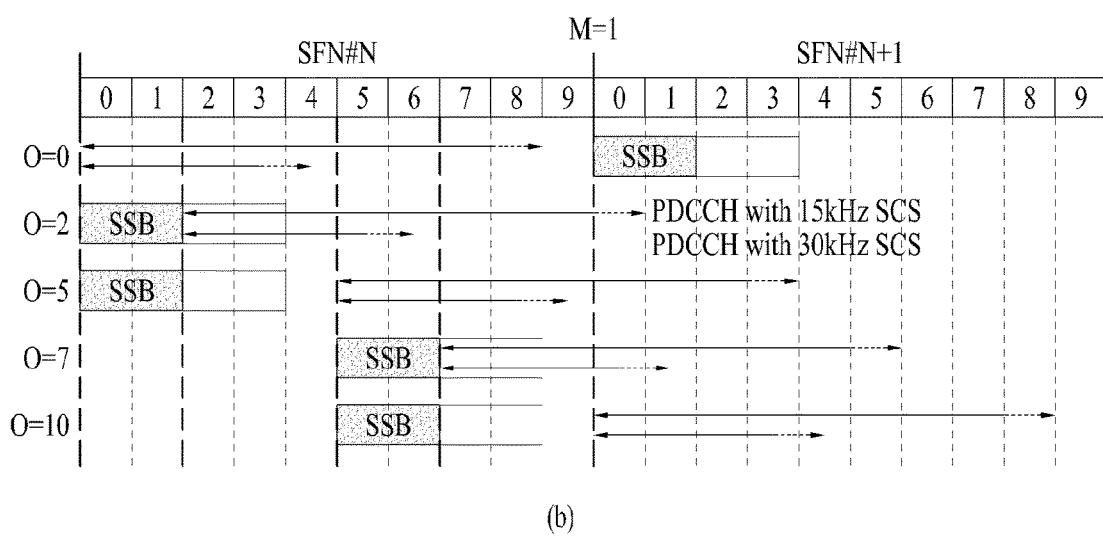
Figure 25:
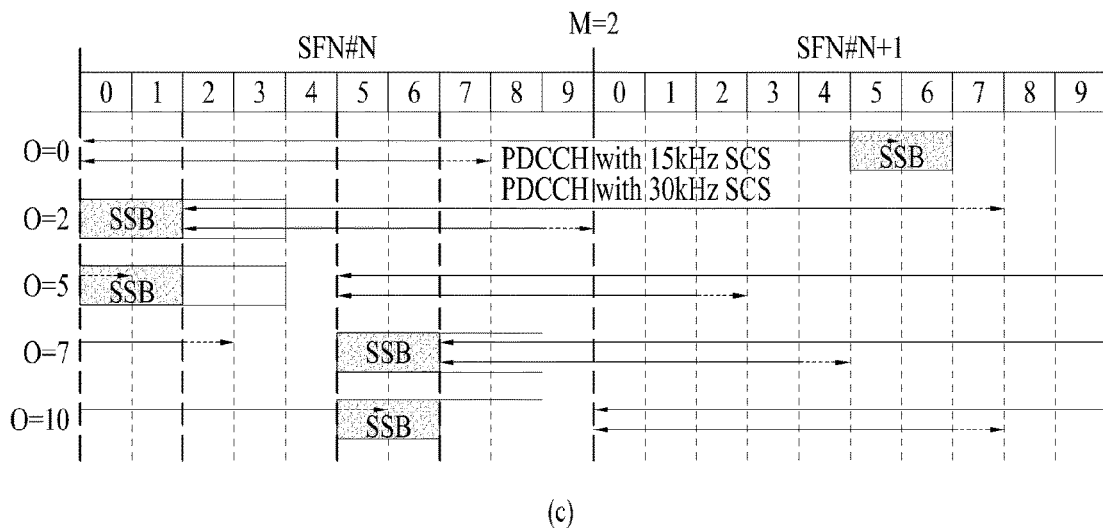

In particular, when an SS/PBCH block in which RMSI is transmitted and PDSCH are multiplexed in time domain, it is necessary for a gNB to transmit the SS/PBCH block for the RMSI and the PDSCH at a different time instance. AS shown in FIG. 25, when multiplexing is performed using a pattern 1 on FR1, if an SFN for transmitting an SS/PBCH burst set is selected from among even-numbered SFNs or odd-numbered SFNs, it is able to avoid a collision between the SS/PBCH for RMSI and the PDSCH.

Figure 26:
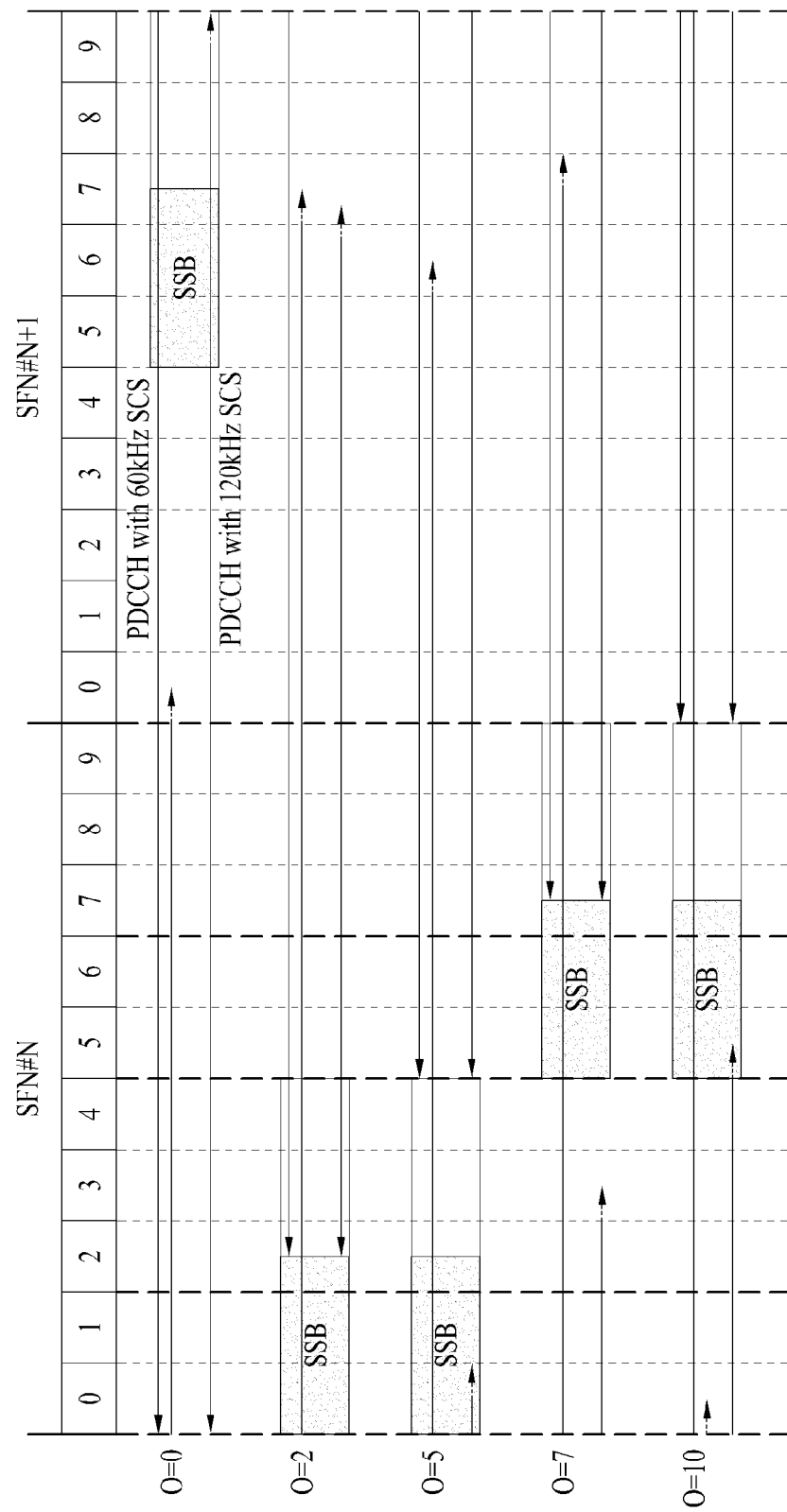

In most cases on FR2, it is able to prevent a collision by appropriately combining configuration parameters such as selection of an SS/PBCH block index, subcarrier spacing of PDSCH, a value of a monitoring window offset, etc. However, when M corresponds to 2 on the FR2, it is difficult to avoid a collision between an SS/PBCH block and PDSCH. In order to avoid the collision, as illustrated in FIG. 26, it may use a method of setting a limit on the number of SS/PBCH blocks.

(9) Configuration of PMSI PDCCH Monitoring Window Occasion for Multiplexing Pattern 2

A candidate positon of an SS/PBCH block in a slot is determined within a range capable of keeping a partial OFDM symbol for DL control and UL control.

In order to guarantee UL control transmission in all slots, an SS/PBCH block is not allocated to OFDM symbols of indexes 12 and 13. However, when a multiplexing pattern 2 of which subcarrier spacing of {SS/PBCH block, PDCCH} corresponds to {240, 120} kHz is monitored, a configuration of PDCCH monitoring occasion is defined in the OFDM symbols of the indexes 12 and 13. Specifically, a slot index ($n_c$) of the multiplexing pattern 2 is defined as follows.

0, 1, 2, 3, 0, 1 in i=8k, i=8k+1, i=8k+2, i=8k+3, i=8k+6, i=8k+7 ($n_c=n_{ssB,i}$)

12, 13 in i=8k+4, i=8k+5 ($n_c=n_{ssB,i}-1$)

In particular, an occasion for UL control transmission is not permitted in slots for the multiplexing pattern 2.

Hence, it may consider a method of configuring a PDCCH monitoring occasion for DL transmission in OFDM slots having indexes of 0, 1, 2, and 3 included in each slot. FIG. 27 illustrates RMSI PDCCH monitoring window occasions for the multiplexing pattern 2.

Referring to FIG. 27, the number of OFDM symbols for performing PDCCH monitoring is less than the number of SS/PBCH blocks included in a slot. In order to solve the problem, it may set a limit on the number of SS/PBCH blocks and change a mapping rule applied to slots of SS/PBCH block indexes.

Specifically, a mapping rule applied to slots of SS/PBCH block indexes such as one-to-one mapping is maintained and a mapping rule applied to an OFDM symbol of an SS/PBCH index can be changed. As a different method, a plurality of SS/PBCH block indexes can be mapped to the same OFDM symbol.

1) Set a limit on the number of SS/PBCH blocks

Entry #1: 0, 1, 2, 3, 0, 1 in i=8k, i=8k+1, i=8k+2, i=8k+3, i=8k+4, i=8k+5 ($n_c = n_{ssB,i}$)

Entry #2: 0, 2, 0 in i={8k, 8k+1}, i={8k+2, 8k+3}, i={8k+4, 8k+5} ($n_c = n_{ssB,i}$)

2) Mapping a plurality of SS/PBCH block indexes to the same OFDM symbol

Entry #3: 0, 1, 0, 1 in i={8k, 8k+1}, i={8k+2, 8k+3}, i={8k+4, 8k+5}, i={8k+6, 8k+7} ($n_c = n_{ssB,i}$)

Figure 28:
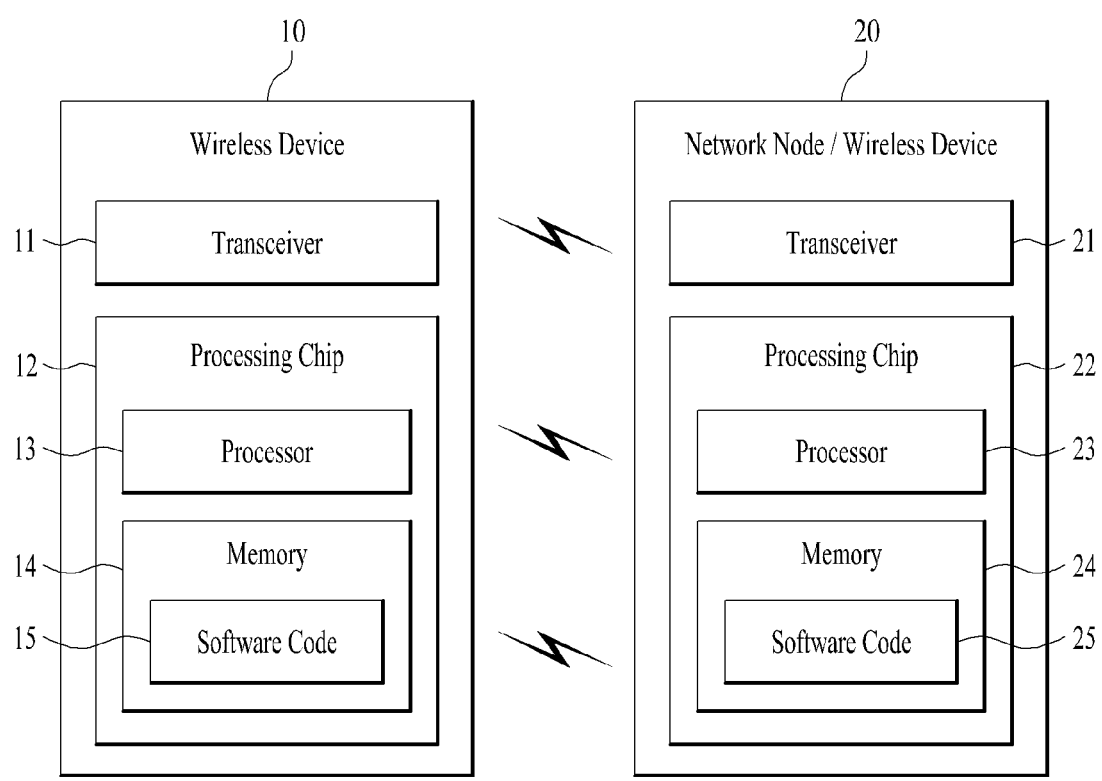
FIG. 28 is a block diagram illustrating configuration elements of a wireless device that performs the present invention.

FIG. 28 is a block diagram illustrating an example of communication performed between a wireless device 10 and a network node 20. In this case, the network node 20 can be replaced with a wireless device or a UE shown in FIG. 28.

In the present specification, a wireless device 10 or a network node 20 includes a transceiver 11/21 configured to communicate with one or more other wireless devices, a network node, and/or a different element of a network. The transceiver 11/21 can include one or more transmitter, one or more receivers, and/or one or more communication interfaces.

The transceiver 11/21 can include one or more antennas. The antenna performs a function of transmitting a signal processed by the transceiver 11/21 to the external or a function of receiving a radio signal from the external and forwarding the signal to a processing chip 12/22 according to one embodiment of the present invention. The antenna can be referred to as an antenna port as well. Each antenna may correspond to a physical antenna or can be configured by a combination of two or more physical antenna elements. A signal transmitted from each antenna is not further decomposed by the wireless device 10 or the network node 20. A reference signal (RS), which is transmitted in response to an antenna, defines the antenna in the aspect of the wireless device 10 or the network node 20. The RS enables the wireless device 10 or the network node 20 to estimate a channel for the antenna irrespective of whether a channel corresponds to a single wireless channel from a physical antenna or a composite channel from a plurality of physical antenna elements including the antenna. In particular, an antenna is defined to induce a channel on which a symbol on an antenna is forwarded from a channel on which a different symbol on the same antenna is forwarded. In case of a transceiver supporting a MIMO (Multi-Input Multi-Output) function that transmits and receives data using a plurality of antennas, the transceiver can be connected with two or more antennas.

According to the present invention, the transceiver 11/21 can support receive beamforming and transmit beamforming. For example, the transceiver 11/21 according to the present invention can be configured to perform functions illustrated in FIGS. 5 to 8.

And, the wireless device 10 or the network node 20 includes a processing chip 12/22. The processing chip 12/22 can include at least one processor such as a processor 13/23 and at least one memory device such as a memory 14/24.

The processing chip 12/22 can control at least one of methods and/or processes described in the present specification. In other word, the processing chip 12/22 can be configured to perform at least one or more embodiments described in the present specification.

The processor 13/23 includes at least one processor for performing a function of the wireless device 10 or the network node 20 described in the present specification.

For example, the at least one processor can transmit and receive information by controlling the transceiver 11/21 illustrated in FIG. 28.

The processor 13/23 included in the processing chip 12/22 performs coding and modulation on a signal and/or data to be transmitted to the external of the wireless device 10 or the network node 20 and transmits the signal and/or the data to the transceiver 11/21. For example, the processor 12/23 converts a data string to be transmitted into the K number of layers by performing de-multiplexing, channel coding, scrambling, modulation, etc. on the data string. The coded data string is also referred to as a codeword. The codeword is equivalent to a transport block corresponding to a data block provided by MAC layer. A transport block (TB) is coded by a codeword and a codeword is transmitted to a reception device in a form of one or more layers. In order to perform frequency up converting, the transceiver 11/21 can include an oscillator. The transceiver 11/21 can include the $N_t$ (Nt is a positive integer equal to or greater than 1) number of Tx antennas.

The processing chip 12/22 includes a memory 14/24 configured to store data, a programmable software, and/or other information for performing the embodiments described in the present specification.

In other word, according to the embodiments of the present specification, when the memory 14/24 is executed by at least one processor such as the processor 13/23, the memory enables the processor 13/23 to perform all or a part of the processes controlled by the processor 13/23 mentioned earlier in FIG. 28. Or, the memory stores a software code 15/25 including commands for performing the embodiments described in the present specification with reference to FIGS. 1 to 27.

Specifically, according to the embodiment of the present invention, the processing chip 12 of the wireless device 10 controls an SS/PBCH block to be received from a base station and obtains an offset value indicating a position of an RMSI CORESET via PBCH content (i.e., MIB) included in the SS/PBCH block. In this case, as mentioned in the foregoing description, the offset value corresponds to an offset value between the lowest PRB index of the RMSI CORESET and a PRB of an SS/PBCH having the highest frequency position among a plurality of SS/PBCH blocks positioned at the below and above of the lowest PRB index. In other word, the offset value corresponds to an offset value between an SS/PBCH block closest to the center of the RMSI CORESET and the RMSI CORESET.

Meanwhile, as mentioned in the foregoing description, the PRB offset value between the RMSI CORESET and the SS/PBCH block can be restricted based on subcarrier spacing, a synchronization raster, and the minimum channel bandwidth. In other word, in order to prevent too many bits from being used for indicating the PRB offset value, it may set a limit on a range of a synchronization raster according to subcarrier spacing and configure an offset value based on the adjusted range. Hence, the number of bits necessary for indicating the offset value may vary.

The processing chip 12 of the wireless device 10 determines a frequency positon of the RMSI CORESET based on the offset value, receives PDCCH for scheduling RMSI within the RMSI CORESET, which is determined based on information on a size of the RMSI CORESET obtained via the PBCH contents (i.e., MIB), and controls RMSI to be obtained based on scheduling information of the PDCCH. In this case, the size of the RMSI CORESET can be obtained together via a bit for indicating the offset value.

According to the embodiment of the present invention, the processing chip 22 of the network node 20 controls an SS/PBCH block to be transmitted to a UE. In this case, the processing chip 22 of the network node 20 can control the SS/PBCH block to be transmitted to the UE by including information on an offset value corresponding to a relative frequency position between the lowest PRB of an RMSI CORESET and an SS/PBCH block having a high frequency position among a plurality of SS/PBCH blocks in PBCH contents (i.e., MIB). In other word, the offset value corresponds to an offset value between an SS/PBCH block closest to the center of the RMSI CORESET and the RMSI CORESET. And, it is able to know a size of the RMSI CORESET as well via values of bits for the offset value.

Meanwhile, as mentioned in the foregoing description, the PRB offset value between the RMSI CORESET and the SS/PBCH block can be restricted based on subcarrier spacing, a synchronization raster, and the minimum channel bandwidth. In other word, in order to prevent too many bits from being used for indicating a PRB offset value, it may set a limit on a range of a synchronization raster according to subcarrier spacing and configure an offset value based on the adjusted range. Hence, the number of bits necessary for indicating the offset value may vary.

Subsequently, the processing chip 22 of the network node 20 controls PDCCH for scheduling RMSI to be transmitted within the RMSI CORESET based on the information on the RMSI CORESET included in the PBCH contents and controls the RMSI to be transmitted to the UE according to the scheduling of the PDCCH.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of transmitting and receiving a downlink channel and an apparatus therefor are described with reference to examples applied to 5G New RAT system, it may be applicable to various kinds of wireless communication systems as well as the 5G New RAT system.

What is claimed is:

1. A method for receiving a Physical Downlink Control Channel (PDCCH) for Remaining Minimum System Information (RMSI) by a user equipment (UE) in a wireless communication system, the method comprising:
receiving a SS/PBCH block including a synchronization signal (SS) and a Physical Broadcasting Channel (PBCH);
obtaining information related to a control resource set (CORESET) for the PDCCH via the PBCH; and
receiving the PDCCH within the CORESET based on the information,
wherein the information includes an offset between a frequency position of the CORESET and a frequency position of the SS/PBCH block related to the CORESET, and
wherein available values for the offset are defined based on a subcarrier spacing of the SS/PBCH block and a minimum channel bandwidth,
wherein the offset informs the UE of a frequency position of a lowest resource block (RB) of the CORESET, and
wherein an index of a frame including a first start slot of a monitoring window for the CORESET related to the SS/PBCH block having index #2n is different from an index of a frame including a second starting slot of a monitoring window of the CORESET related to the SS/PBCH block having index #2n+1.

2. The method according to claim 1, wherein a size of a synchronization raster is defined based on the minimum channel bandwidth and the subcarrier spacing.

3. The method according to claim 1, wherein a number of bits required for the information depends on the subcarrier spacing and the minimum channel bandwidth.

4. A wireless device for receiving a Physical Downlink Control Channel (PDCCH) for Remaining Minimum System Information (RMSI) in a wireless communication system, the wireless device comprising:

a memory; and a processor operatively connected with the memory and configured to:

receive a SS/PBCH block including a synchronization signal (SS) and a Physical Broadcasting Channel (PBCH);

obtain information related to a control resource set (CORESET) for the PDCCH via the PBCH; and receive the PDCCH within the CORESET based on the information, wherein the information includes an offset between a frequency position of the CORESET and a frequency position of the SS/PBCH block related to the CORESET, and wherein available values for the offset are defined based on a subcarrier spacing of the SS/PBCH block and a minimum channel bandwidth, wherein the offset informs the wireless device of a frequency position of a lowest resource block (RB) of the CORESET, and wherein an index of a frame including a first start slot of a monitoring window for the CORESET related to the SS/PBCH block having index #2n is different from an index of a frame including a second starting slot of a monitoring window of the CORESET related to the SS/PBCH block having index #2n+1.

5. The wireless device according to claim 4, wherein a size of a synchronization raster is defined based on the minimum channel bandwidth and the subcarrier spacing.

6. The wireless device according to claim 4, wherein a number of bits required for the information depends on the subcarrier spacing and the minimum channel bandwidth.

7. A method for transmitting a Physical Downlink Control Channel (PDCCH) for Remaining Minimum System Information (RMSI) by a base station (BS) in a wireless communication system, the method comprising:

transmitting a SS/PBCH block including a synchronization signal (SS) and a Physical Broadcasting Channel (PBCH); and transmitting the PDCCH within a control resource set (CORESET) based on information related to the CORESET for the PDCCH delivered via the PBCH, wherein the information includes an offset between a frequency position of the CORESET and a frequency position of the SS/PBCH block related to the CORESET, and wherein available values for the offset are defined based on a subcarrier spacing of the SS/PBCH block and a minimum channel bandwidth, wherein the offset informs a wireless device of a frequency position of a lowest resource block (RB) of the CORESET, and wherein an index of a frame including a first start slot of a monitoring window for the CORESET related to the SS/PBCH block having index #2n is different from an index of a frame including a second starting slot of a monitoring window of the CORESET related to the SS/PBCH block having index #2n+1.

* * * * *

UNITED STATES PATENT AND TRADEMARK OFFICE
CERTIFICATE OF CORRECTION

PATENT NO. : 10,945,253 B2
APPLICATION NO. : 16/356888
DATED : March 9, 2021
INVENTOR(S) : Hyunsoo Ko et al.

It is certified that error appears in the above-identified patent and that said Letters Patent is hereby corrected as shown below:

In the Claims

Column 46, Line 43, amend "information includes" to --information indicates--.

Column 47, Line 11, amend "information includes" to --information indicates--.

Column 48, Line 14, amend "information includes" to --information indicates--.

Signed and Sealed this
Fourth Day of July, 2023

Katherine Kelly Vidal
*Director of the United States Patent and Trademark Office*